(12) United States Patent
Santos et al.

(10) Patent No.: US 7,415,891 B2
(45) Date of Patent: Aug. 26, 2008

(54) SENSOR MOUNTING STRUCTURE WITH SNAPPING FEATURE

(75) Inventors: Roberto S. Santos, Hudson, MA (US); Mark S. Schladenhauffen, Westford, MA (US); Dennis C. Mackey, Hamilton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 89 days.

(21) Appl. No.: 11/240,175

(22) Filed: Sep. 30, 2005

(65) Prior Publication Data

US 2007/0074583 A1    Apr. 5, 2007

(51) Int. Cl.
*G01N 3/02* (2006.01)
(52) U.S. Cl. .......................................... 73/856; 73/855
(58) Field of Classification Search .................. 73/855, 73/856
See application file for complete search history.

(56) References Cited

U.S. PATENT DOCUMENTS

| | | | |
|---|---|---|---|
| 1,895,179 A | 1/1933 | Thresher | |
| 2,497,456 A | 2/1950 | Johnson | 74/424.8 |
| 2,791,905 A | 5/1957 | Cheney | |
| 3,010,363 A | 11/1961 | Malfeld | 88/40 |
| 3,213,189 A | 10/1965 | Mitchell et al. | |
| 3,281,660 A | 10/1966 | Studenick | |
| 3,354,302 A | 11/1967 | Greasley | 240/8.16 |
| 3,576,563 A | 4/1971 | Scott et al. | 340/380 |
| 3,750,466 A | 8/1973 | Ott et al. | |
| 4,262,181 A | 4/1981 | Tufano et al. | 200/296 |
| 4,505,054 A | 3/1985 | Clark et al. | 33/357 |
| 4,510,408 A | 4/1985 | Jovick et al. | 310/168 |
| 4,515,336 A | 5/1985 | Fischer | 248/288.3 |
| 4,633,081 A | 12/1986 | Hiramatu | |
| 4,798,964 A | 1/1989 | Schmalfuss et al. | |
| 4,805,455 A | 2/1989 | DelGiorno et al. | |
| 5,195,364 A | 3/1993 | Dehe et al. | |
| 5,205,042 A | 4/1993 | Greter et al. | |
| 5,412,816 A | 5/1995 | Paterson et al. | |
| 5,542,859 A | 8/1996 | Ison et al. | 439/536 |
| 5,617,762 A | 4/1997 | Kirsch | 74/490.06 |
| 5,621,370 A | 4/1997 | St. Louis | 337/380 |

(Continued)

FOREIGN PATENT DOCUMENTS

DE    19626291 A1    1/1998

(Continued)

OTHER PUBLICATIONS

MH15: Short housing, clever mounting—for smart solutions Data Sheets, SICK AG.

(Continued)

*Primary Examiner*—Edward Lefkowitz
*Assistant Examiner*—Freddie Kirkland, III
(74) *Attorney, Agent, or Firm*—Whyte Hirschboeck Dudek SC; William R. Walbrun

(57) ABSTRACT

Disclosed herein is a sensing device mounting mechanism allowing for a sensing device to be mounted in relation to a supporting structure. The sensing device mounting mechanism comprises a housing portion having a snapping mechanism. The snapping mechanism allows the housing portion to be coupled to at least one of the supporting structure, the sensing device, and an additional portion of the sensing device mounting mechanism.

53 Claims, 14 Drawing Sheets

U.S. PATENT DOCUMENTS

| | | | | |
|---|---|---|---|---|
| 5,806,955 | A | 9/1998 | Parkyn, Jr. et al. | 362/31 |
| 5,938,310 | A | 8/1999 | Leaman et al. | |
| 5,954,310 | A | 9/1999 | Soldo et al. | 248/660 |
| 5,966,991 | A | 10/1999 | Gosselin et al. | 74/490.01 |
| 6,025,963 | A | 2/2000 | Hippenmeyer et al. | 359/819 |
| 6,033,100 | A | 3/2000 | Marquiss et al. | |
| 6,147,820 | A | 11/2000 | Anselment et al. | 359/823 |
| 6,204,501 | B1 | 3/2001 | Cutler | 250/352 |
| 6,227,501 | B1* | 5/2001 | Malcolm | 248/27.3 |
| 6,244,107 | B1 | 6/2001 | Nelson et al. | 73/431 |
| 6,318,694 | B1 | 11/2001 | Watanabe | 248/371 |
| 6,322,275 | B1 | 11/2001 | Schmidt et al. | 403/14 |
| 6,352,037 | B1 | 3/2002 | Doyle | 108/20 |
| 6,360,999 | B1 | 3/2002 | Liao | 248/27.1 |
| 6,441,361 | B1 | 8/2002 | Bennett, Jr. et al. | 250/221 |
| 6,550,679 | B2 | 4/2003 | Hennick et al. | 235/454 |
| 6,599,049 | B2 | 7/2003 | Erben | 403/27 |
| 6,614,601 | B2 | 9/2003 | Dallakian | 359/804 |
| 6,632,008 | B2 | 10/2003 | Kalkbrenner | 362/554 |
| 6,720,884 | B2 | 4/2004 | O'Connor et al. | 340/643.6 |
| 6,760,206 | B2 | 7/2004 | Daharsh et al. | 361/93.1 |
| 6,799,376 | B1 | 10/2004 | Hillman et al. | |
| 6,858,172 | B2 | 2/2005 | Daharsh et al. | 264/272.14 |
| 6,892,594 | B2 | 5/2005 | Buck et al. | 73/866.5 |
| 6,937,812 | B2 | 8/2005 | Schladenhauffen et al. | 385/146 |
| 7,256,891 | B2 | 8/2007 | Domack et al. | |
| 2003/0211041 | A1 | 11/2003 | Ezratty et al. | |
| 2004/0031385 | A1 | 2/2004 | Neuhaeuser | 92/5 |
| 2004/0049353 | A1 | 3/2004 | Ezratty | |
| 2004/0175988 | A1* | 9/2004 | Chang et al. | 439/552 |
| 2005/0263964 | A1 | 12/2005 | Kumoi | |
| 2007/0074582 | A1* | 4/2007 | Santos et al. | 73/856 |
| 2007/0074591 | A1* | 4/2007 | Santos et al. | 73/866.5 |

FOREIGN PATENT DOCUMENTS

| | | |
|---|---|---|
| EP | 0037896 B1 | 2/1985 |
| FR | 2531568 A1 | 2/1984 |
| GB | 2311805 A | 10/1997 |
| JP | 62236742 A | 10/1987 |
| WO | 97/48578 A | 12/1997 |

OTHER PUBLICATIONS

EC Declaration of Conformity, SICK.
Photoelectric Sensors, Accessories, p. 638, 2000 Edition, SICK.
SMB18S Swivel Mount Bracket datasheet, Oct. 2002., Banner.
Sensor Accessories Sensor Mounting Brackets data sheets, pp. 1-3, Eaton Cutler-Hammer, Jun. 2004.
Installation Accessories data sheets, Micro Detectors, Jan. 2003.
Sensor Brackets and Accessories 2004-2005 (link to pdf file), http://www.softnoze.com/catalog.cfm.
ProxPort™ Mount & Conversion Brackets datasheet, Softnoze USA, Inc.
Swivel-style Universal Brackets (SUB) datasheet, Softnoze USA, Inc.
Accessories—Cables and Connectors—Brackets, pp. 740-754, Banner Engineering Corp., www.bannerengineering.com.
Fixing Brackets and Supports, Sensor Accessories, ST Series datasheets, Datasensor.
Photoswitch® Photoelectric Sensors, Introduction, pp. R1-17 to R1-19, Allen-Bradley.
Photoswitch® Photoelectric Sensors, Accessories, Contents, pp. 1-374 to 1-379, Allen-Bradley.
Sentek Econorush Sensor Holder, Sentek Limited UK, http://www.sentek.co.uk/econrush.htm.
Rosheim, Mark E., Mechanical Design of an Omni-Directional Sensor Mount abstract, http://www.stormingmedia.us/04/0448/A044804.html.

* cited by examiner

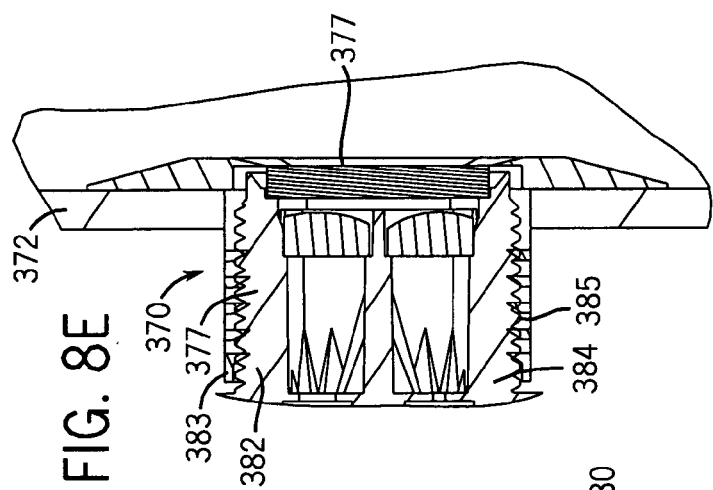
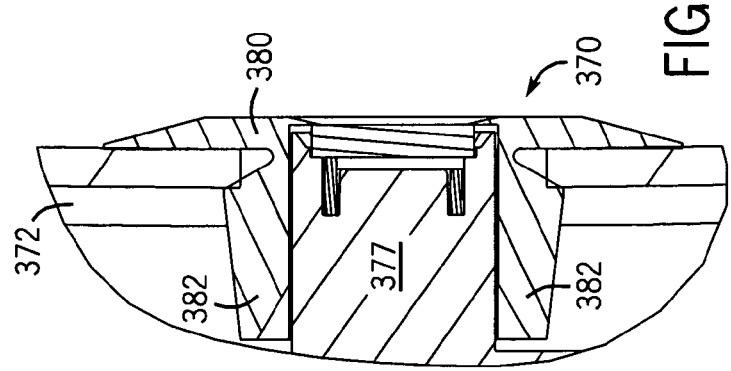
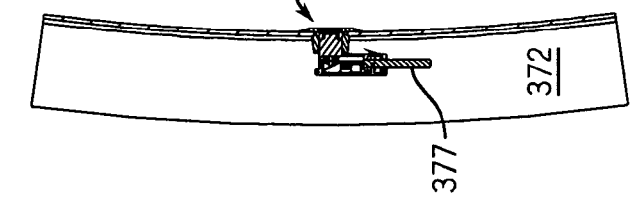
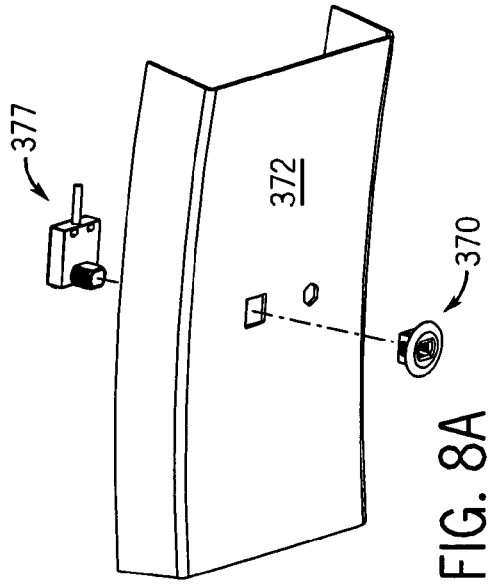
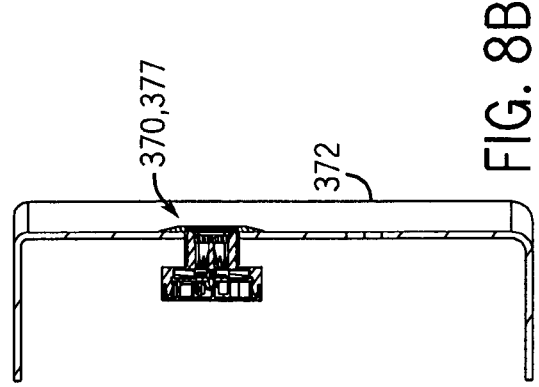

SENSOR MOUNTING STRUCTURE WITH SNAPPING FEATURE

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to sensing devices and, more particularly, relates to various mechanisms, structures and/or methods for mounting sensing devices onto other structures.

BACKGROUND OF THE INVENTION

Sensing devices of many different types are commonly employed in a variety of environments and applications. Sensing devices encompass a broad spectrum of devices including, for example, various light-sensing devices such as laser-sensing devices, light sensing devices that are capable of distinguishing among different colors of visible light, and devices for sensing various other types of radiation including infrared radiation or heat, microwave radiation, and x-ray radiation. Additionally, other sensing devices include, for example, devices that are capable of sensing the position of other structures, acoustic sensors, vibration sensors, motion sensors such as accelerometers, orientation sensors involving gyroscopes, and numerous other types of sensing devices.

Sensing devices are employed in a wide variety of industrial, commercial, military, residential and other environments and applications. For example, in industrial environments, light sensors are often employed in conjunction with conveyor systems/assembly line structures. Such light sensors are often used to detect the presence of objects moving down an assembly line and to determine whether a given object has entered or exited a particular region of the assembly line. Light sensors of similar design can also be used in residential applications, for example, in connection with garage door openers. Also for example, in many commercial facilities as well as residential homes, various sensing devices are used in security systems in order to detect the presence of potential intruders within or nearby those facilities or homes. Sensing devices can further be implemented on vehicles, for example, to detect the presence of objects behind vehicles. Indeed, sensing devices are ubiquitous in today's modem world.

In many circumstances, it is desirable that sensing devices be able to be mounted in simple, user-friendly manners. Yet conventional mechanisms for mounting sensing devices often lack such desired simplicity and user-friendliness. For example, many sensing devices are mounted onto other structures by way of awkward or heavy brackets or by way of screws or other parts. Mounting of the sensing devices onto the support structure through the use of these brackets and other components often requires (or is facilitated by) the use of various tools, and in various circumstances can be complicated due to the configuration of the support structures on which the sensing devices are being mounted. For example, in some cases, it may be difficult to tighten a screw or bolt in order to attach the sensing device and supporting bracket onto the support structure where there is insufficient room for the person performing the installation to insert a tool such as a screwdriver or a wrench. Also, to the extent that these mounting mechanisms for sensing devices require small parts such as screws, installation of the sensing devices can become cumbersome simply due to the possibility of the person performing the installation dropping or losing the small parts.

For at least these reasons, therefore, it would be advantageous if improved mounting mechanisms or structures for use in mounting sensing devices to other support structures could be developed. In particular, in at least some embodiments, it would be desirable if such improved mounting mechanisms facilitated the simple and quick installation of sensing devices without the use of many small parts or cumbersome tools.

BRIEF SUMMARY OF THE INVENTION

The present inventors have recognized the importance of providing mounting mechanisms for sensing devices that allow for relatively easy assembly of the sensing devices in relation to supporting structures. The present inventors further have recognized that, in at least some embodiments, such mounting mechanisms could be achieved through the use of snapping features or similar components.

More particularly, the present invention relates to a sensing device mounting mechanism allowing for a sensing device to be mounted in relation to a supporting structure. The sensing device mounting mechanism comprises a housing portion having a snapping mechanism. The snapping mechanism allows the housing portion to be coupled to at least one of the supporting structure, the sensing device, and an additional portion of the sensing device mounting mechanism.

In another embodiment, the present invention relates to an assembly comprising a sensing device having an outer surface that includes at least one recess, and a sensing device mounting mechanism. The mounting mechanism comprises a housing portion that at least partially surrounds the sensing device, the housing portion including an insert portion that protrudes into the recess of the sensing device when the sensing device is at least partially received and supported within the housing portion.

In yet another embodiment, the present invention relates to a sensing device mounting mechanism in combination with a sensing device. The combination comprises a sensing device and a sensing device mounting mechanism. The mounting mechanism includes a housing that is mountable to a support structure, and the housing defines an interior for receiving and supporting a sensing device. The mounting mechanism further includes means for providing snapping engagement of at least one of the housing to the supporting structure, and the housing to the sensing device.

And in another embodiment, the present invention relates to a method of attaching a sensing device in relation to a supporting structure. The method comprises providing a housing portion and snapping the housing portion in relation to at least one of the sensing device, the supporting structure and another mounting mechanism portion.

BRIEF DESCRIPTION OF THE DRAWINGS

FIGS. 8A-8E illustrate exploded, side sectional, and enlarged detailed views of a further exemplary embodiment of a mounting mechanism including a snapping mechanism that is being utilized to mount a sensing device onto a panel-type supporting structure;

DETAILED DESCRIPTION OF THE PREFERRED EMBODIMENT

Figure 1:
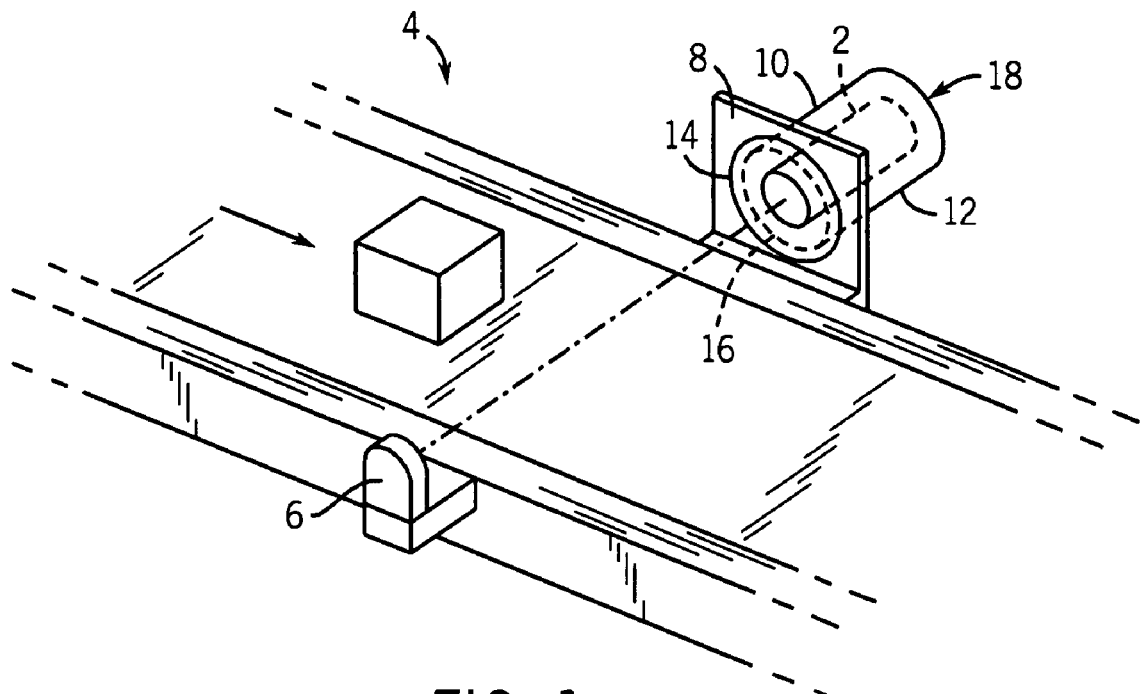
FIG. 1 is a generalized perspective view of a sensing device mounting mechanism including a snapping mechanism in accordance with at least one embodiment of the present invention, with the mounting mechanism implemented in one exemplary manufacturing application.

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. Like reference numerals are used to indicate like components.

FIG. 1 illustrates a sensing device 2 shown to be implemented in one exemplary application, namely, a conveyor system 4 as is often found in manufacturing and other commercial facilities implemented in assembly lines or the like. The sensing device 2 in the present embodiment is a light sensing device capable of receiving and detecting the presence of a light beam (e.g., a laser beam) emitted by a light source 6 located on the opposite side of the conveyor system 4. As shown, the sensing device 2 in particular is mounted onto a supporting structure 8 of the conveyor system 4 by way of a mounting mechanism 10.

Although the mounting mechanism 10 (as well as the supporting structure 8 and the sensing device 2) can have a variety of different structural forms and shapes depending upon the embodiment, FIG. 1 shows the mounting mechanism 10 to have a generally mushroom-shaped exterior including a generally cylindrical stem portion 12 and a flange portion 14 extending outward from the stem portion at a first end 16 of the stem portion. In the embodiment shown, the mounting mechanism 10 is positioned onto the supporting structure 8, which is a panel (or other substantially flat flange or wall of low to moderate thickness), by inserting a second end 18 of the stem portion 12 through a complementary orifice within the supporting structure 8. When fully attached or coupled to the supporting structure 8, the flange 14 abuts the supporting structure 8. As will be described in further detail in relation to others of the FIGS., the mounting mechanism 10 with the flange portion 14 can be secured in relation to the supporting structure 8 in a variety of ways.

While in the present embodiment shown in FIG. 1 the mounting mechanism 10 and sensing device 2 are arranged such that the sensing device receives signals entering at the first end 16 of the stem portion 12 where the flange 14 abuts the supporting structure 8, in alternate embodiments the mounting mechanism and sensing device could be arranged in an opposite manner relative to the panel-type supporting structure, e.g., where signals entered at the second end 18 of the stem portion located away from the supporting structure. Further, while in the present embodiment the flange portion 14 has a curved or contoured shape, the flange portion could also be of a rectangular shape or other arbitrary shape. Additionally, while in the present embodiment (and as shown in several of the FIGS. herein), the mounting mechanism 10 employs the cylindrical stem portion 12, in alternate embodiments the mounting mechanism could have another tubular shape or, indeed, an outer surface of arbitrary shape (e.g., the mounting mechanism could have a box-shaped outer surface). Also, depending upon the embodiment, the flange portion 14 could be located at a different location (i.e., other than that currently shown) such as midway along the length of the cylindrical stem portion 12. Further, although the present embodiment envisions that the mounting mechanism 10 would be fully secured to (e.g., fixed in relation to) the supporting structure 8, the present invention is also intended to encompass embodiments that could allow for some relative (e.g., sliding or rotational) motion between the mounting mechanism and the supporting structure.

Although the sensing device 2 of FIG. 1 is a light sensing device, it should be understood that embodiments of the present invention are intended to be applicable with respect to numerous different types of sensing devices including, for example, other light-sensing devices (e.g., color-sensing devices, etc.), devices for sensing various other types of radiation (e.g., infrared, microwave, x-ray, etc.), position-sensing devices, acoustic sensors, vibration sensors, motion sensors such as accelerometers, orientation sensors involving gyroscopes, and numerous other types of sensing devices. Also, while FIG. 1 shows the sensing device 2 to be implemented in connection with the conveyor system 4, it should be understood that embodiments of the present invention are intended to be applicable with respect to the mounting of a variety of different types of sensing devices onto a variety of different supporting structures in a variety of different industrial, commercial, military, residential and other environments and in connection with a variety of different applications.

Exemplary applications for the light sensing device arrangement of FIG. 1 can include, for example, "transmitted beam" or "through beam" applications. However, other applications, including but not limited to "retroreflective" and "diffuse" applications, are known and considered to be within the scope of present invention. In the context of a retroreflective application, for example, the sensing device 2 would both emit and detect light that was reflected off of a target reflector that can be positioned where the light source 6 is located. Similarly, in the context of a diffuse application, the sensing device 1 would both emit and detect light that was reflected off of the object to be sensed (i.e., without the use of a light source positioned where the light source 6 is shown to be located).

Figure 1A:
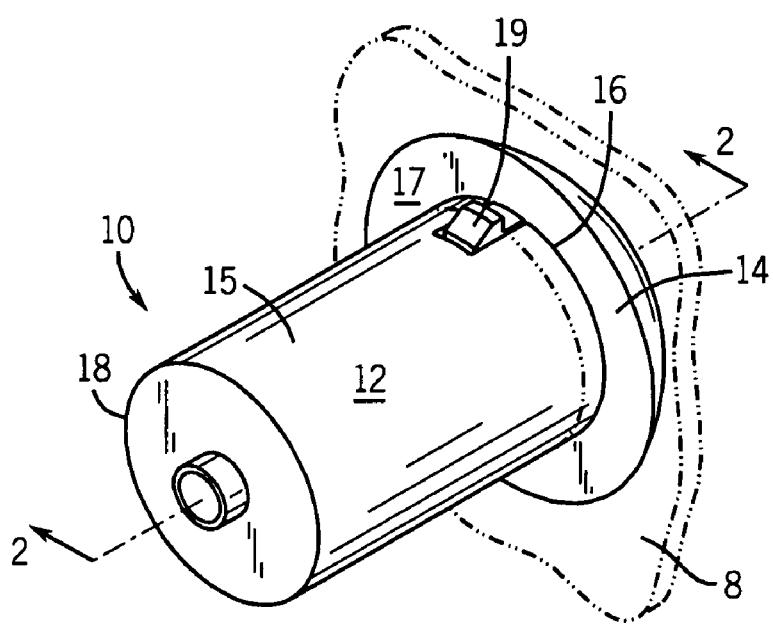
FIG. 1A is a reverse perspective view the sensing device mounting mechanism included an exemplary snapping mechanism and mounted onto a supporting structure in accordance with at least one embodiment of the present invention.

FIG. 1A is a reverse perspective view the sensing device mounting mechanism 10 mounted onto a supporting structure 8, similar to that of FIG. 1, in accordance with at least one embodiment of the present invention. FIG. 1A shows the mounting mechanism 10 again to have a generally mushroom-shaped exterior housing 15 including a substantially cylindrical stem portion 10 and a flange portion 14 (also referred to herein as a "flange") protruding outward from the stem portion 10 at a first end 16 of the stem portion. The flange portion 14 includes a generally circular disc-shaped surface 17 that extends from the stem portion, and the disc-shaped surface substantially abuts the supporting structure 8 when the mounting mechanism is mounted and ready for use. As with the FIG. 1 embodiment, the mounting mechanism 10 is positioned onto the supporting structure 8, which is a panel (or other substantially flat flange or wall of low to moderate thickness), by inserting a second end 18 of the housing 15 through a complementary orifice within the supporting structure 8 and passing the mounting mechanism 10 through the orifice up until the disc-shaped surface 17 substantially abuts the supporting structure. Also shown is an exemplary embodiment of a snapping mechanism 19.

The mounting mechanism 10 shown in FIG. 1 can take a variety of more specific forms, as described in greater detail with respect to FIGS. 2-18B. Referring to FIGS. 2A-E, five related embodiments of mounting mechanisms, referred to by numeral 20, are shown to be mounted on a panel-type supporting structure 22. Although the embodiments of FIGS. 2A-E differ from one another somewhat as described below, it will be understood that the embodiments share certain similarities. Consequently, the same numerals are used throughout these illustrations when the same or similar features are shown. Also as shown, FIGS. 2A-E show cross-sectional views of the mounting mechanisms. It will be understood that the cross-sectional views are generally views that could be obtained by taking a cut along line 2-2 of FIG. 1A, e.g., a cut extending through a space existing between the snapping mechanism 19 and the remainder of the mounting mechanism 10.

Although the mounting mechanisms 20, as well as the supporting structures 22, can each have a variety of different structural forms and shapes depending upon the embodiment, FIGS. 2A-E show the mounting mechanisms 20 again to have a generally mushroom-shaped exterior housing 24 including a substantially cylindrical stem portion 26 and a flange portion 28 protruding outward from the stem portion. The flange portion 28 includes a generally circular disc-shaped surface 30 that extends from the stem portion, and the disc-shaped surface substantially abuts the supporting structure 22 when the mounting mechanism is mounted and ready for use. As with the FIG. 1 embodiment, the mounting mechanism 20 is positioned onto the supporting structure 22, which is a panel (or other substantially flat flange or wall of low to moderate thickness), by inserting an end 32 of the housing 24 through a complementary orifice within the supporting structure 22 and passing the mounting mechanism 20 through the orifice up until the disc-shaped surface 30 substantially abuts the supporting structure. Sensing device 34 is typically then inserted into an interior 36 of the housing 24. Advantageously, the flanged portion 28 includes one or more stops 40, which serve to further secure the sensing device 34 within the interior 36 of the housing 24. As a practical matter, the sensing device 34 can be inserted and then secured within the interior 36, in the present embodiment and throughout the FIGS., using any of a number of different options, including, but not limited to: threads, snaps, dove tails, fasteners, adhesives, among others.

Still referring to FIGS. 2A-E, the mounting mechanism 20 can be secured in relation to the supporting structure 22 in a variety of ways as will be described herein with respect to the FIGS. As illustrated, in the present embodiment, the housing 24 of the mounting mechanism 20 further includes a plurality of flexible snapping mechanisms 42, 44 that extend from flange portion 28 (or from an area in the stem portion 26 that is near or adjacent the flange portion). The flexible snapping mechanisms 42, 44 secure the housing 24 of the mounting mechanism 20 to the support structure 22 via a snap-fit engagement. In the present embodiment, the snapping mechanisms 42 include a ramped surface portion 42a having a first ramped surface 43 and a substantially straight portion 42b. Similarly, the snapping mechanisms 44 include a ramped surface portion 44a having a first ramped surface 45 and a substantially straight portion 44b. When the housing 24 is mounted to the supporting structure 22, and more specifically, as the stem portion 26 of the housing 24 is moved through and past the orifice in the supporting structure, snapping mechanism ramped surface portions 42a, 44a contact the supporting structure and cause the snapping mechanisms 42, 44, respectively, to deflect in a known manner (as shown, the snapping mechanisms would deflect inwardly toward the interior 36) until the ramped surface portions have passed beyond the orifice. In an alterative embodiment, the flexible snapping mechanisms 42, 44 can optionally comprise opposing second ramped surfaces 47, 49, which are indicated by dashed lines. At that point, the snapping mechanisms 42, 44 return or spring back, so as to engage, the supporting structure 22. In each of these embodiments, substantially straight portions 42b and 44b of snapping mechanisms 42, 44, respectively, are sized to correspond to the width "x" of the supporting structure 22, and in this manner, the housing 24 is securely mounted.

Still referring to FIGS. 2A-E, advantageously, when the sensing device 34 is positioned within the interior 36 of the housing 24 after mounting of the housing to the supporting structure 22, and in particular when the sensing device is positioned to mate with and abut one or more stops 40, undesired deflection of the snapping mechanisms 42, 44 is prevented. More specifically, when inserted, the sensing device 34 can abut the flexible snapping mechanisms 42, 44, thereby creating a force that locks the snapping mechanisms into place. This, in turn, reduces or minimizes the likelihood of de-coupling or de-mounting of the housing 24 from the supporting structure 22 when the mounting mechanism 20 and sensing device 34 are mounted and ready for use. Other variations are contemplated for use with the present embodiment. For example, it is contemplated that the one or more stops 40 could be created adjacent end 32 and the sensing device 34 inserted through an appropriately sized orifice in the flange portion 28.

Figure 2A:
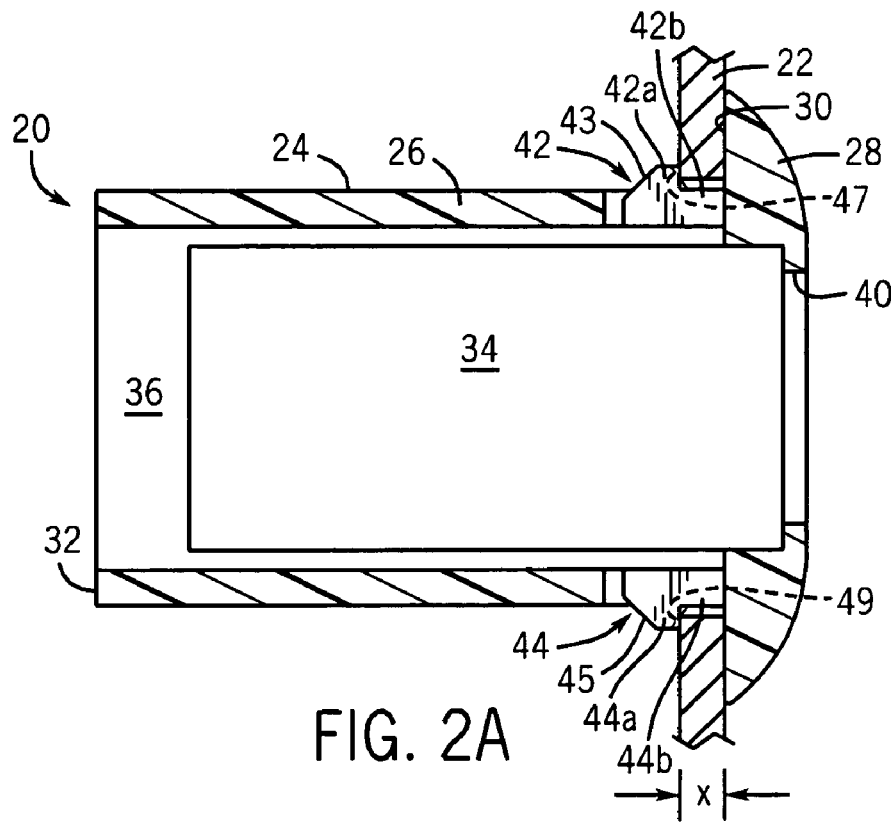
FIGS. 2A-2E are cross-sectional views of various related exemplary embodiments of mounting mechanisms including snapping mechanisms that are being utilized to mount sensing devices onto a panel-type supporting structures.
Figure 2B:
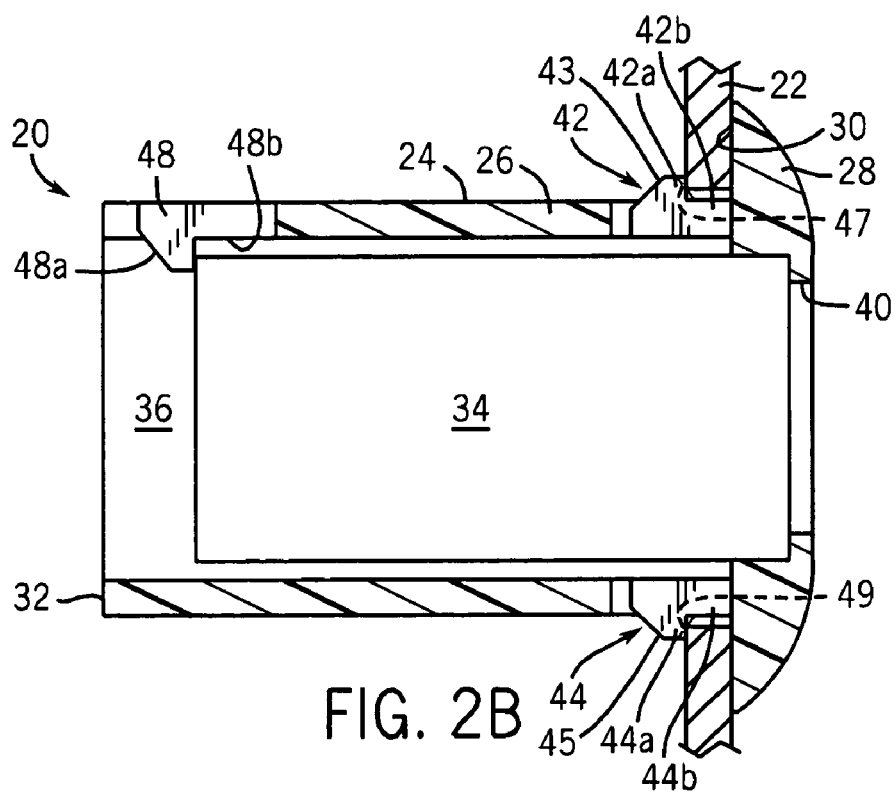

Referring specifically to FIG. 2B, another version of the sensing device mounting mechanism 20 further includes a flexible snapping mechanism 48 positioned proximate end 32 of the housing 24. The snapping mechanism 48 comprises a ramp surface portion 48a and a substantially straight portion 48b. As the sensing device 34 is inserted into the housing 24, the sensing device contacts the ramp surface portion 48a, causing the snapping mechanism 48 to deflect, in a known manner, outwardly from the interior 36 of the housing. Once fully inserted into the housing 24, the sensing device 34 abuts the one or more stops 40 and the flexible snapping mechanism 48 springs or deflects back (i.e., towards the interior 36) to its original position (as shown). In this fashion, the snapping mechanism 48, in conjunction with the one or more stops 40, can serve to secure or lock the sensing device within the housing 24 in proper position when the sensing device is mounted and ready for use. It should be understood that the snapping mechanism 48 (or a plurality of such snapping mechanisms) can be used in conjunction with various other of the embodiments described or contemplated herein (but not necessarily shown), and particularly with respect to those embodiments in which the sensing device is inserted, secured, and/or mounted in a manner similar to that of FIG. 2A.

Figure 2C:
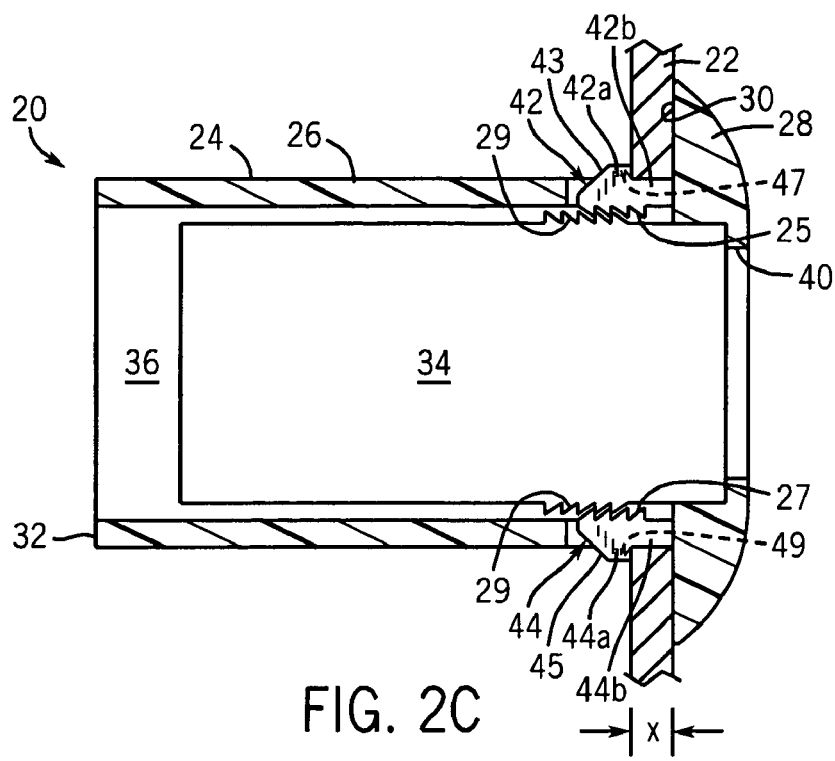

Turning specifically to FIG. 2C, another version of the sensing device mounting mechanism 20 is shown, but in this example, snapping mechanisms 42 and 44 further comprise ratchet-like teethed surfaces 25 and 27, respectively. Additionally, the sensing device 34 includes a ratchet-like teethed surface or profile 29 which is complementary in size and shape to that of the snapping mechanism teethed surfaces 25, 27. As the sensing device 34 is inserted into the housing 24, the sensing device teethed surface 29 and the snapping mechanism teethed surfaces 25 and 27 engage in complementary fashion until the sensing device is fully inserted such that the device abuts the one or more stops 40. Here again, the snapping mechanisms 43, 45 deflect and spring back as needed (inwardly and outwardly with respect to the interior 36 of the housing as the case may be) as the sensing device is inserted into the interior. Accordingly, the snapping mechanisms 43, 45, in conjunction with the one or more stops 40, and the sensing device 34 due to its ratchet-like profile 29, serve to receive and support the sensing device within the housing 24 in proper position when the sensing device is mounted and ready for use. It should be understood that the snapping mechanisms 42, 44 and ratchet-like profile 29 can be used in conjunction with various other of the embodiments described or contemplated herein (but not necessarily shown). Although not shown in the present embodiment, in this and other embodiments, a snapping mechanism (similar to the snapping mechanism 48 shown in FIG. 2B) can be used to further ensure that the sensing device 34 is positioned within the housing 24 so as to lock the snapping mechanisms 42, 44 into engagement with the supporting structure 22.

Figure 2D:
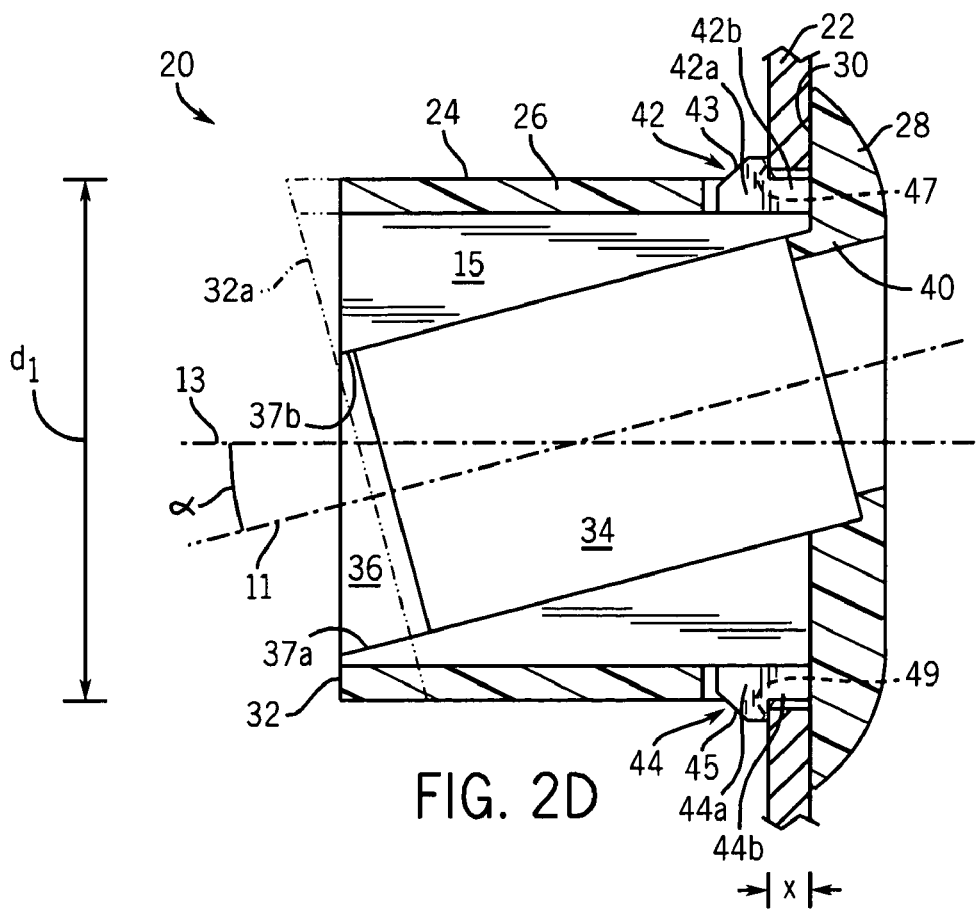
Figure 2E:
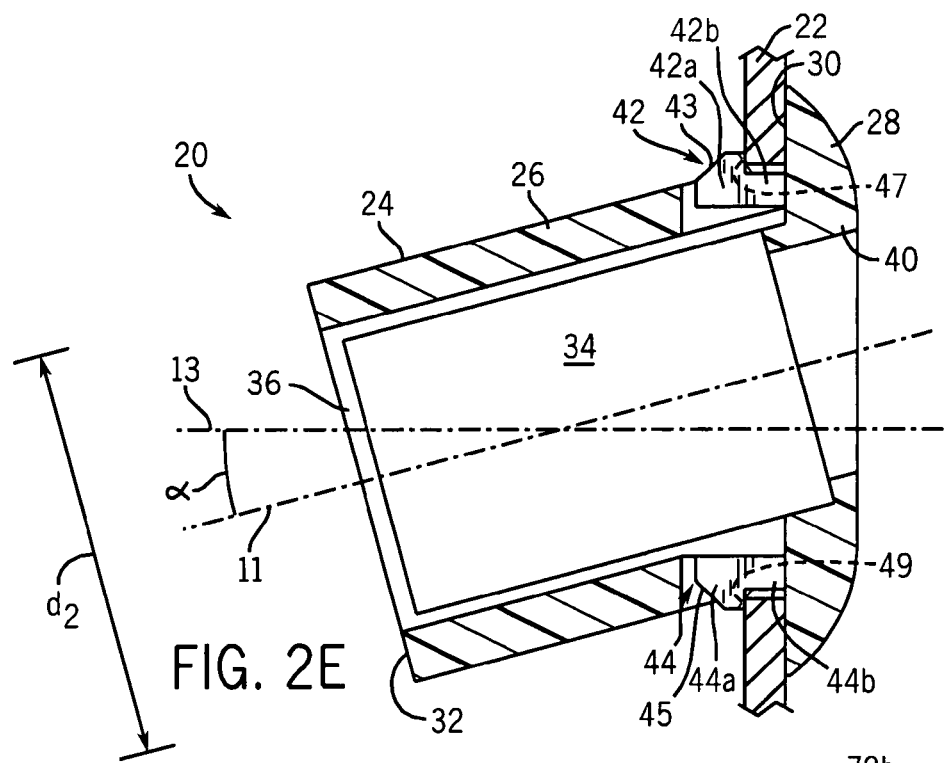

Referring to FIGS. 2D and 2E, additional versions of the sensing device mounting mechanism 20 are shown, but in these examples, the sensing device 34 is positioned along a plane, indicated by dashed line 11, which is at an angle α relative to a plane, indicated by dashed line 13, having a known orientation (e.g., a plane that is perpendicular to the supporting structure 32). Referring specifically to FIG. 2D, housing 24 itself is parallel to the known orientation 13. However, the mounting mechanism 20 further includes a sensing device supporting material 15 (which can be integral with, or separate but coupled to, the housing 24) that defines the interior 36 into which the sensing device 34 is received. More specifically, the interior 36 is bounded by sensing device supporting material surfaces 37a-b, which are oriented at the angle α. In this fashion, the sensing device 34 is positioned in the desired orientation. In contrast, referring to FIG. 2E, the housing 24 itself is oriented at the angle α. The sensing device 34, which is supported substantially directly by the housing 24 (as opposed to with a sensing device supporting material) which is oriented at the angle α (e.g, 15 degrees), also referred to as an angular offset or sensing device angular offset.

Referring to FIGS. 2D and 2E, it can be seen that the distance $d_1$ corresponding to the width or diameter of the housing is greater than the distance $d_2$ corresponding to the width of the housing 24 in FIG. 2E. As such, orienting the sensing device 34 using the mounting mechanism 20 as shown in FIG. 2E allows for a narrower profile relative the embodiment of FIG. 2D. As a result, in the embodiment of FIG. 2E, the mounting mechanism can be accommodated by a smaller hole in the supporting structure 22 than in FIG. 2D. Additionally, the sensing device 34 in FIG. 2E is positioned at an angle up to a location that is proximate end 32, and this permits greater visibility of any light source (e.g., a light emitting diode) facing out of the end 32 than is the case in the embodiment of FIG. 2D. Also, with reference to FIG. 2D, the housing 24 (along with the material 15 can have an end 32a (shown in phantom) that is angled (e.g., for example at an angle of 15 degrees with respect to a direction that is parallel to the supporting structure) to enhance the visibility of a light source(s), for example, a light emitting diode.

In general, in the embodiments of FIGS. 2A-E, the position of the sensing device 34 can be selected, offset, or varied depending on the configuration or orientation of the mounting mechanism 20. Further, the present embodiment contemplates variations in the type, positioning, size and number of the snapping devices 42, 44 employed. For example, additional slots can be created proximate to stops 40 in the flange portion 28 so as to accommodate arrow-shaped snapping mechanisms described in other embodiments. Moreover, the sensing device 34, here and in other embodiments, can be fitted within the housing structure using any of a number of mounting provisions, including dove tails, screws, adhesives, snapping mechanisms, among others.

Figure 3:
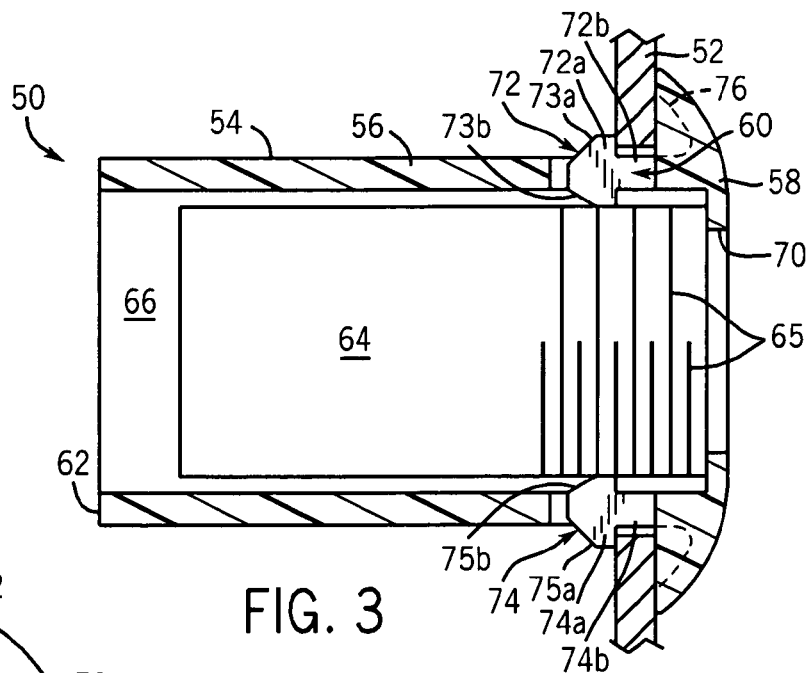
FIG. 3 is a cross-sectional view of another exemplary embodiment of a mounting mechanism including a snapping mechanism that is being utilized to mount a sensing device onto a panel-type supporting structure.

Turning to FIG. 3, another such embodiment of a mounting mechanism 50 is shown mounted on a panel-type supporting structure 52. Although the mounting mechanism 50, as well as the supporting structure 52, can have a variety of different structural forms and shapes depending upon the embodiment, FIG. 3 shows the mounting mechanism 50 to have a generally mushroom-shaped exterior housing 54 including a substantially cylindrical stem portion 56 and a flange portion 58 protruding outward from the stem portion. The flange portion 58 includes a generally circular disc-shaped surface 60 that extends from the stem portion, and the disc-shaped surface substantially abuts the supporting structure 52 when the mounting mechanism is mounted and ready for use. As with the embodiments of FIGS. 1 and 2, the mounting mechanism 50 is positioned onto the supporting structure 52, which is a panel (or other substantially flat flange or wall of low to moderate thickness), by inserting an end 62 of the housing 54 through a complementary orifice within the supporting structure 52 and passing the mounting mechanism 50 through the orifice up until the disc-shaped surface 60 substantially abuts the supporting structure. Sensing device 64 is typically then inserted into an interior 66 of the housing 54. Here too, the flanged portion 58 advantageously includes one or more stops 70, which serve to further secure the sensing device 64 within the interior 66 of the housing 54. As already noted, the sensing device 64 can be inserted and then secured within the interior 36 using any of a variety of different options, including, but not limited to: threads, snaps, dove tails, fasteners, adhesives, among others. As shown, sensing device 64 includes threads 65 to engage the housing 54 so as to insert and position the sensing device.

Still referring to FIG. 3, the housing 54 of the mounting mechanism 50 further includes a plurality of flexible arrow-shaped snapping mechanisms 72, 74 that extend from flange portion 58 (or from an area in the stem portion 56 that is proximate the flange portion). The flexible snapping mechanisms 72, 74 secure the housing 54 of the mounting mechanism 50 to the support structure 52 via a snap-fit engagement. In the present embodiment, the snapping mechanism 72, includes a double ramped surface portion 72a having ramped surfaces 73a-b, and a substantially straight portion 72b. Similarly, the snapping mechanism 74 includes a double ramped surface portion 74a having ramped surfaces 75a-b, and a substantially straight portion 74b. When the housing 54 is mounted to the supporting structure 52, and more specifically, as the stem portion 56 of the housing 54 is moved through and past the orifice in the supporting structure, snapping mechanism double ramped surface portions 72a, 74a contact the supporting structure and cause the snapping mechanisms 72, 74, respectively, to deflect in a known manner (as shown, the snapping mechanisms would deflect inwardly toward the interior 66) until the ramped surface portions have passed beyond the orifice. In alterative embodiments, flexible snapping mechanisms can comprise additional ramped surfaces, similar to those described and shown above with respect to FIGS. 2A-2E. Then the snapping mechanisms 72,74 return or spring back, so as to engage, the supporting structure 52. More specifically, substantially straight portions 72b and 74b of the snapping mechanisms 72, 74, respectively, are sized to correspond to the width of the supporting structure (as with FIGS. 2A-2E), and in this manner, the housing 54 is securely mounted. Further, a cut(s) 76 (shown in phantom) can be formed in the flange portion 58 and serve to aid in minimizing the cross-sectional thickness of the flange portion 58, thereby allowing for an increased length of the straight portions 72b, 74b so as to increase the flexibility of the snapping mechanisms 72,74. In addition, the cut(s) 76 that can be formed in the flange portion 58 can also allow for some flexibility of the flange portion 58 so as to be able to accommodate some variation in the gauge thickness "x" of the support structure 52 while still providing a retaining force.

Figure 3A:
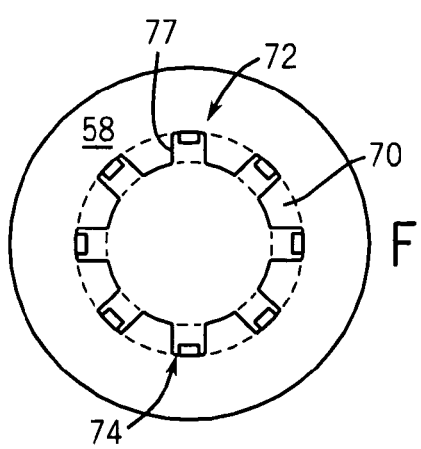
FIG. 3A is a front perspective view of FIG. 3 (without the sensing device shown)

FIG. 3A is a front perspective view of FIG. 3 without sensing device 64 (FIG. 3) shown. Referring to FIGS. 3 and 3A, a plurality of slots 77 extending through stop 70 of flange 58 can be utilized to assist with the creation of a plurality of flexible arrow-shaped snapping mechanisms 72, 74.

Advantageously, when the sensing device 64 is positioned within the interior 66 of the housing 54 after mounting the housing to the supporting structure 52, undesired deflection of the snapping mechanisms 72, 74 is prevented. In particular, this occurs when the sensing device 64 is positioned to mate with and abut stop surface 40, since, when inserted, the sensing device 64 can abut the flexible snapping mechanisms 72, 74 and create a force that locks the snapping mechanisms into place. More specifically, the threads 65 of the sensing device 64 push, and thereby force, ramped surface portions 72a and 74a so they abut supporting structure 52. As a result, the likelihood of de-coupling or de-mounting of the housing 54 from the supporting structure 52 when the mounting mechanism 50 and sensing device 64 are mounted and ready for use is reduced. Moreover, when the sensing device 64 includes threads 65 (as illustrated), the ramped surfaces 73b and 75b facilitate insertion of the sensing device into the interior 66 by reducing or minimizing interference between the snapping mechanisms 72, 74 and the sensing device threads. Other variations are contemplated for use with the present embodiment. For example, it is contemplated that one or more stops could be created adjacent the housing end 62 so as to stop and position the sensing device 64 when the sensing device is inserted through an appropriately sized orifice in the flange portion 58.

Figure 4:
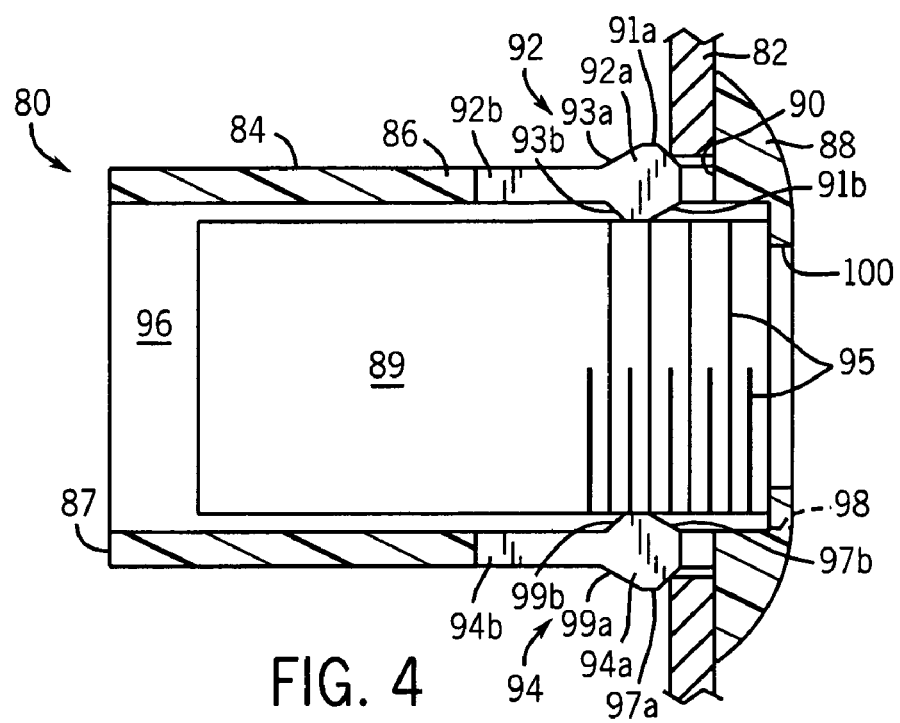
FIG. 4 is a cross-sectional view of another exemplary embodiment of a mounting mechanism including a snapping mechanism that is being utilized to mount a sensing device onto a panel-type supporting structure.

FIG. 4 shows another embodiment of a mounting mechanism 80 shown mounted on a panel-type supporting structure 82. As with the previously described FIGS., although the mounting mechanism 80, as well as the supporting structure 82, can have a variety of different structural forms and shapes depending upon the embodiment, FIG. 4 shows the mounting mechanism 80 to have a generally mushroom-shaped exterior housing 84 including a substantially cylindrical stem portion 86 and a flange portion 88 protruding outward from the stem portion. The flange portion 88 includes a generally circular disc-shaped surface 90 that extends from the stem portion, and the disc-shaped surface substantially abuts the supporting structure 82 when the mounting mechanism is mounted and ready for use. As with the previous embodiments, the mounting mechanism 80 is positioned onto the supporting structure 82, which is a panel (or other substantially flat flange or wall of low to moderate thickness), by inserting an end 87 of the housing 84 through a complementary orifice within the supporting structure 82 and passing the mounting mechanism 80 through the orifice up until the disc-shaped surface 90 substantially abuts the supporting structure. Sensing device 89 is typically then inserted into an interior 96 of the housing 84. Here too, the flanged portion 88 advantageously includes one or more stops 100, which serve to further secure the sensing device 89 within the interior 96 of the housing 84. As already noted, the sensing device 89 can be inserted and then secured within the interior 96 using any of a variety of different options, including, but not limited to: thread(s), snaps(s), dove tail(s), fastener(s), and adhesive(s), among others. As shown, sensing device 89 includes threads 95 to engage the housing 84 so as to insert and position the sensing device.

Still referring to FIG. 4, the housing 84 of the mounting mechanism 80 further includes a plurality of flexible snapping mechanisms 92, 94. In contrast to the previous embodiments, the flexible snapping mechanisms 92, 94 in the present embodiment extend from stem portion 86 located distal from the flange portion 88, in a manner protruding generally toward the flange portion (rather than away fro the flange portion as in the previous embodiments). The snapping mechanisms secure the housing 84 of the mounting mechanism 80 to the support structure 82 via a snap-fit engagement. In the present embodiment, the snapping mechanism 92 includes a dumbbell-shaped ramped surface portion 92a having first opposing ramped surfaces 91a-b and second opposing ramped surfaces 93a-b, as well as a substantially straight portion 92b. Similarly, the snapping mechanism 94 includes a dumbbell-shaped ramped surface portion 94a having first opposing ramped surfaces 97a-b and second opposing ramped surfaces 99a-b, as well as a substantially straight portion 94b. The flexible snapping mechanisms 92, 94, and in particular the straight portions 92b, 94b, respectively, can be made longer as compared to those of the previous embodiments, and as such, the flexibility of the snapping mechanisms can be increased.

When the housing 84 is mounted to the supporting structure 88, and more specifically, as the stem portion 86 of the housing 84 is moved through and past the orifice in the supporting structure 82, dumbbell-shaped ramped surface portions 92a, 94a contact the supporting structure and cause the snapping mechanisms 92, 94, respectively, to deflect (again as shown, the snapping mechanisms would deflect toward the interior 96) until the dumbbell-shaped surface portions have passed beyond the orifice. Then the snapping mechanisms 92, 94 return or spring back, so as to engage, the supporting structure 82.

Still referring to FIG. 4, advantageously, when the sensing device 89 is positioned within the interior 96 of the housing 84 after mounting the housing to the supporting structure 82, undesired deflection of the snapping mechanisms 92, 94 is prevented. In particular, the sensing device 89 is positioned to mate with and abut stops 100, and the sensing device 89, when inserted, can abut the flexible snapping mechanisms 92, 94 and create a force (outwardly from the interior 96 as shown) that locks the snapping mechanisms into place. More specifically, the threads 95 of the cylindrically threaded sensing device 89 push, and thereby force, the dumbbell-shaped ramped surface portions 92a and 94a so they abut supporting structure 82. As a result, the likelihood of de-coupling or de-mounting of the housing 84 from the supporting structure 82 when the mounting mechanism 80 and sensing device 89 are mounted and ready for use is reduced and/or minimized. Moreover, it is notable that when the sensing device 89 includes threads 65 (as illustrated in the present embodiment), the ramped surfaces 93b and 99b facilitate insertion of the sensing device into the interior 96 by reducing or minimizing interference between the snapping mechanisms 92, 94 and the sensing device threads. Other variations are contemplated for use with the present embodiment. For example, it is contemplated that one or more stops could be created adjacent end 92 so as to stop and position the sensing device 89 when the sensing device is inserted through an appropriately sized orifice in the flange portion 88. Further, a plurality of slots 98 extending through stop 100 of flange 88 can be utilized to assist with the creation of a plurality of flexible arrow-shaped snapping mechanisms 92, 94.

Figure 5:
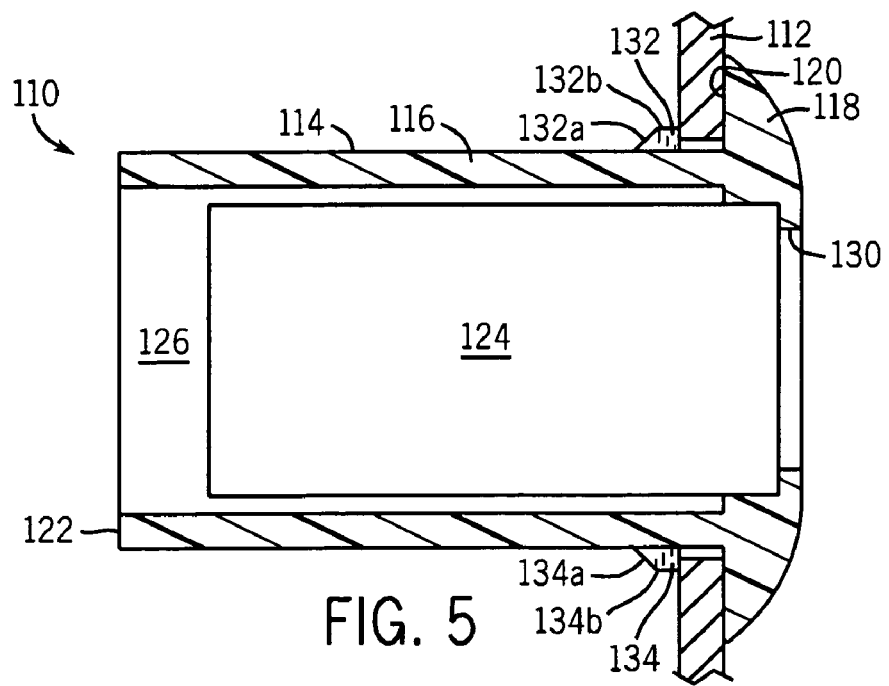
FIG. 5 is a cross-sectional view of another exemplary embodiment of a mounting mechanism including a snapping mechanism that is being utilized to mount a sensing device onto a panel-type supporting structure.

FIG. 5 shows another embodiment of a mounting mechanism 110 shown mounted on a panel-type supporting structure 112. As with the previously described FIGS., although the mounting mechanism 110, as well as the supporting structure 112, can have a variety of different structural forms and shapes depending upon the embodiment, FIG. 4 shows the mounting mechanism 110 to have a generally mushroom-shaped exterior housing 114 including a substantially cylindrical stem portion 116 and a flange portion 118 protruding outward from the stem portion. The flange portion 118 includes a generally circular disc-shaped surface 120 that extends from the stem portion, and the disc-shaped surface substantially abuts the supporting structure 112 when the mounting mechanism is mounted and ready for use. As with the previous embodiments, the mounting mechanism 110 is positioned onto the supporting structure 112, which is a panel (or other substantially flat flange or wall of low to moderate thickness), by inserting an end 122 of the housing 114 through a complementary orifice within the supporting structure 112 and passing the mounting mechanism 110 through the orifice up until the disc-shaped surface 120 substantially abuts the supporting structure. Sensing device 124 is typically then inserted into an interior 126 of the housing 114. Here too, the flanged portion 118 advantageously includes one or more stops 130, which serve to further secure the sensing device 124 within the interior 126 of the housing 114. As already noted, the sensing device 124 can be inserted and then secured within the interior 126 using any of a variety of different options, including, but not limited to: threads, snap(s), dove tail(s), fastener(s), and adhesive(s), among others. In an alternative embodiment, the sensing device 124 can be mounted directly to the supporting structure 112 or to the flange portion 118, via for example, a threaded exterior sensing device surface or other mounting means.

In contrast to the embodiments of the previous FIGS., the housing 114 of the mounting mechanism 110 further includes a plurality of rigid or substantially rigid (as opposed to flexible) snapping mechanisms 132, 134 (as opposed to flexible snapping mechanisms) that extend from flange portion 118 (or from an area in the stem portion 116 that is proximate the flange portion). The rigid snapping mechanisms 132, 134 secure the housing 114 of the mounting mechanism 110 to the support structure 112 via a snap-fit engagement.

Still referring to FIG. 5, in the present embodiment, the snapping mechanisms 132 include a ramped surface portion 132a and a substantially straight portion 132b. Similarly, the snapping mechanisms 134 include a ramped surface portion 134a and a substantially straight portion 134b. When the housing 114 is mounted to the supporting structure 118, and more specifically, as the stem portion 116 of the housing 114 is moved through and past the orifice in the supporting structure, rigid snapping mechanisms 132, 134 contact the supporting structure. Unlike the previous embodiments (where the supporting structure caused the snapping mechanisms to deflect) the rigid snapping mechanisms 132, 134 of the present embodiment do not deflect, or spring back, (albeit the snapping mechanisms and/or the housing generally do deform slightly while passing through the orifice of the supporting structure). Still, once the snapping mechanisms 132, 134 have passed beyond the orifice, they engage the supporting structure 112. In alterative embodiments, rigid snapping mechanisms can comprise opposing double ramped surface portions, which would be similar to that described above with respect to FIG. 2. Other variations are contemplated for use with the present embodiment. For example, in an alternative embodiment, a plurality of rigid snapping mechanisms can be placed in alternating or opposing fashion so as, for example, to secure the sensing device to the housing, or to secure the housing to the supporting structure. Also, it is contemplated that the one or more stops 130 could be created adjacent the housing end 122 so as to stop, and thereby position, the sensing device 124 when the sensing device is inserted through an appropriately sized orifice in the flange portion 118. Moreover, although not shown, in an alternative embodiment the sensing device 124 and the housing 114 can be of a unitary construction, that is, the sensing device and housing can be constructed as a single unit.

Figure 6:
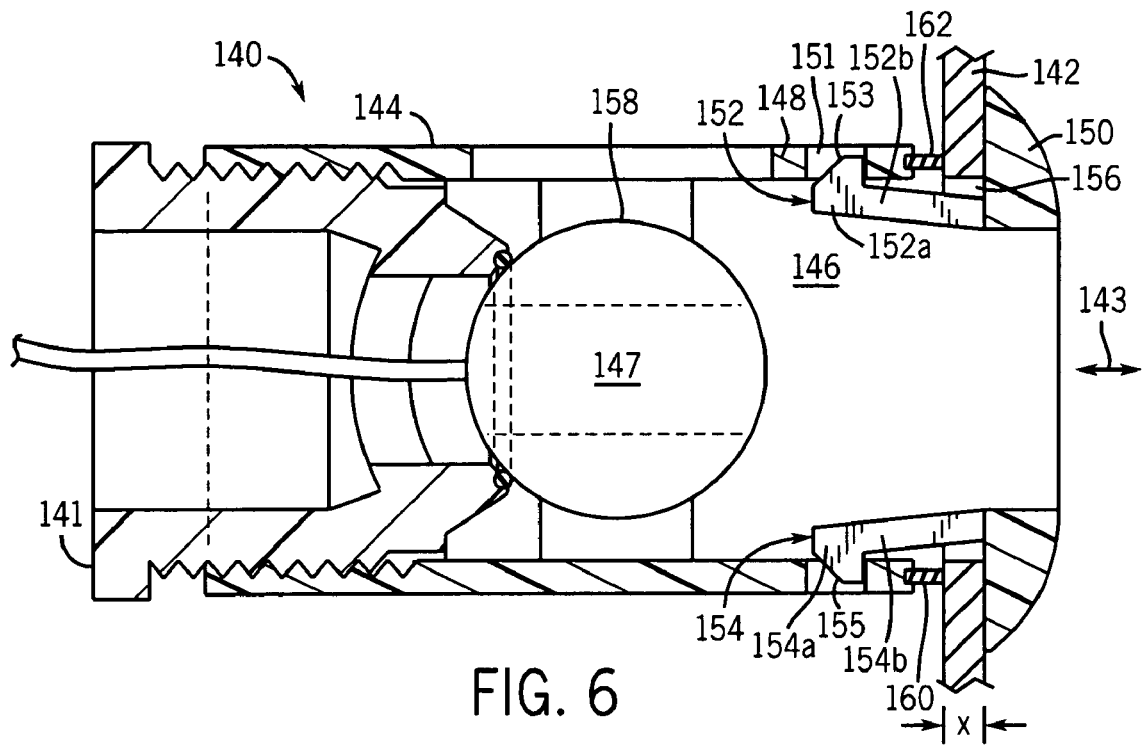
FIG. 6 is a cross-sectional view of another exemplary embodiment of a mounting mechanism including a snapping mechanism and a swivel ball mechanism that is being utilized to mount a sensing device onto a panel-type supporting structure.

FIG. 6 shows another embodiment of a mounting mechanism 140 shown mounted on a panel-type supporting structure 142. As with the previously described FIGS., although the mounting mechanism 140, as well as the supporting structure 142, can have a variety of different structural forms and shapes, in the present embodiment, the mounting mechanism 140 again includes a housing 144 defining an interior 146 for receiving and supporting a sensing device 147. Further, in the present embodiment, the housing 144 includes two primary component portions or sections, namely, a cylindrical stem portion 148 and a mushroom-like flange portion 150. Flange portion 150 includes resilient, flexible snapping mechanisms 152 and 154. The size, shape, quantity and position of the snapping mechanisms can vary to convenience. However, as shown, the snapping mechanisms 152, 154 each include ramped portions 152a and 154a, respectively, as well as substantially straight arm-like portions 152b and 154b, respectively. The ramped portions 152a, 154a include ramped surfaces 153 and 155, respectively.

The sensing device 147 can be mounted onto the supporting structure 142 by using the mounting mechanism 140 in the following manner. Flange portion 150 can be fit or passed through orifice 156 of support structure 142 so that the flange portion and supporting structure abut or substantially abut one another. As the flange portion 150 passes through the orifice 156, the snapping mechanisms 152, 154, and specifically the ramped surfaces 153 and 155, respectively, may (but need not, at least in some cases) contact the supporting mechanism, but can be deflected or depressed so as to permit the flange portion to further proceed through the orifice. When the stem portion 148 is slid into position, a front edge 162 of the stem portion causes the snapping mechanisms 152, 154 to deflect inwardly (i.e., towards the interior 146 of the housing 144). Such deflection can occur, at least in part, via contact between the edge 162 and the ramp surfaces 153, 155 of the snapping mechanisms 152, 154 and until the arrow-shaped portions 152a and 154a fit into complementary orifices or slots 151, in the housing 144 in a snap-fit manner.

Still referring to FIG. 6, in the present embodiment, a piece of foam, rubber, or other compressible material 160 is coupled to stem portion 148 (or the flange portion 150), which fits concentrically around the flange portion 150 (and around snapping mechanisms 152, 154, which themselves are positioned about the sensing device 147). The material 160 is compressed between the stem portion 148 and the supporting structure 142 until an appropriate mounting of the sensing device 147 is achieved. More particularly, the stem portion 148 is slidably positioned, in a direction indicated by arrow 143, so as to engage, snapping mechanisms 152, 154 using the compressible material 160. In this manner, advantageously, the mounting mechanism 140 can be mounted to supporting structures having varying gauge thickness "x". Once compressed, the material 160 pushes the sleeve-like stem portion 148 away from the supporting structure 142, and thereby acts as a tensioning device to hold, in cooperation with the snapping mechanism 152, 154, the sensing device and mounting mechanism in a mounted position even despite, by way of example and not limitation, variations in gauge thickness of the supporting structure.

In further embodiments (and as shown), the mounting mechanism 140 housing 144 can receive a swivel ball 158 within mounting structure or other supports provided along the interior of the stem portion 148. The sensing device 147 is supported within the swivel ball 158, which allows for adjustments in the rotational orientation of the sensing device. Also as shown, the rotational orientation of the swivel ball (and sensing device) can be locked in place by way of a screw portion 141 that screws into the stem portion of the housing via interfacing threads of the screw portion and the interior of the housing. Upon sufficient rotation of the screw portion relative to the housing, an O-ring or rubber gasket interfaces the swivel ball, locking it in place. Such embodiments involving swivel balls, screw portions and the like are described in more detail in, for example, co-pending U.S. patent application Ser. No. 11/240,033, entitled "Sensor Mounting Structure with Adjustable Swivel Ball and Panel Mounting Mechanism" filed on even date herewith, which is hereby incorporated by reference herein.

Figure 7:
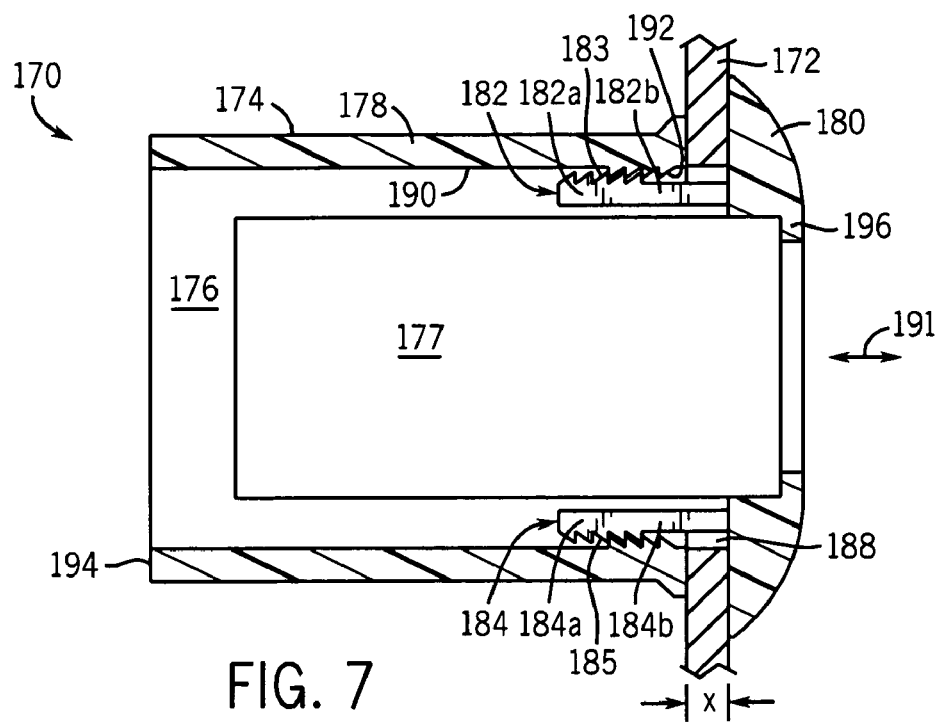
FIG. 7 is a cross-sectional view of another exemplary embodiment of a mounting mechanism including a snapping mechanism that is being utilized to mount a sensing device onto a panel-type supporting structure.

FIG. 7 is a cross-sectional view, showing yet another sensing device mounting mechanism 170 for mounting to a supporting structure 172 in accordance with at least one embodiment of the present invention. As with the previously described FIGS., although the mounting mechanism 170, as well as the supporting structure 172, can have a variety of different structural forms and shapes depending upon the embodiment, in the present embodiment, the mounting mechanism 170 again includes a housing 174 defining an interior 176 for receiving and supporting a sensing device 177. Further, in the present embodiment, the housing 174 includes two component portions, namely, a substantially cylindrical stem portion 178 and a mushroom-like flange portion 180.

In the present embodiment, the flange portion 180 includes interior snapping mechanisms 182, 184. Here again, the precise size, shape, quantity and position of interior snapping mechanisms 182, 184 can vary to convenience, depending on the particular application. Snapping mechanism 182 includes a ratchet-like portion 182a having a teeth-like ridged surface 183, and an elongated stem portion 182b which extends from the flange portion 180. Similarly, snapping mechanism 184 includes a ratchet-like portion 184a having a teeth-like ridged surface 185, and an elongated stem portion 184b that extends from the flange portion 180. The stem portion 178 includes an interior surface 190 having a teeth-like ridged surface(s) 192 which engage complementary ridged surfaces 183, 185 of the snapping mechanisms 182, 184, and using these complementary surfaces, the position of the stem portion 178 can be varied with respect to the flange portion 180 in a direction indicated by arrow 191.

Still referring to FIG. 7, the sensing device 177 can be mounted onto the mounting mechanism 170 in the following manner. Flange portion 180 can be fit or passed through orifice 188 of support structure 172 so that the flange portion and supporting structure abut or substantially abut one another. The stem portion 178 is then slidably positioned, so as to engage, snapping mechanisms 182, 184. Finally, the sensing device 177 is positioned into flange portion 180 between the snapping mechanism 182, 184. Alternatively, the sensing device 177 can be positioned prior to positioning the stem portion 178, and in this instance, the stem portion slides over the sensing device. The sensing device 177 can be positioned within the interior 176 by sliding the sensing device past end 194, between the snapping mechanisms 182, 184 and into contact with one or more stops 196, advantageously, in the flange portion 180. In this manner, the stops 196 serve to further secure the sensing device 177 relative to the flange portion 180 when positioned in a mounted position.

In this manner, and due particularly to the relationship of the complementary surfaces 183, 185, the mounting mechanism 170 can be mounted to supporting structures of varying gauge thickness "x".

FIGS. 8A-E illustrate exploded, side section, and enlarged detailed views of a particular variation of the embodiment of the mounting mechanism 370 shown in FIG. 2C for mounting a sensing device 377 onto the panel-type supporting structure 372. As shown in FIGS. 8A-E, the mounting mechanism 370 is for use with the sensing device 377 having a generally cylindrical protrusion that is generally curved with the exception of two flattened sides. The curved portions of the cylindrical protrusion, but not the flattened sides, are threaded (or have ridges). Referring particularly to FIG. 8D, a flange portion 380 of the mounting mechanism 370 includes the snapping mechanisms 382, 384, which extend generally alongside the flattened sides of the generally cylindrical protrusion. The snapping mechanisms 382, 384 in particular allow for the mounting mechanism 370 to be mounted to the supporting structure 372. FIG. 8D shows the snapping mechanisms 382, 384 to slightly overlap the supporting structure 372, as an indication that in practice the snapping mechanisms may be slightly deformed when snapped in relation to the supporting structure. Referring further to FIG. 8E, the flange portion 380 also includes first and second ridged surfaces 383, 385 (also called blades) that interface the threaded, curved portions of the cylindrical protrusion, so as to attach that protrusion (and the remainder of the sensing device 377) in relation to the mounting mechanism 370 and thus in relation to the supporting structure 372. It can further be seen from FIG. 8D that in the present embodiment the sensing device 377 can comprise an assembly that includes a window, an optics holder and the like. It should further be noted that the present invention is intended to encompass a wide variety of sensor mounting structures including embodiments of mounting mechanisms that also include light pipes, as described in U.S. patent application Ser. No. 11/240,019 entitled "Sensor Mounting Structure With Light Pipe" filed on even date herewith, which is hereby incorporated by reference herein.

Figure 9A:
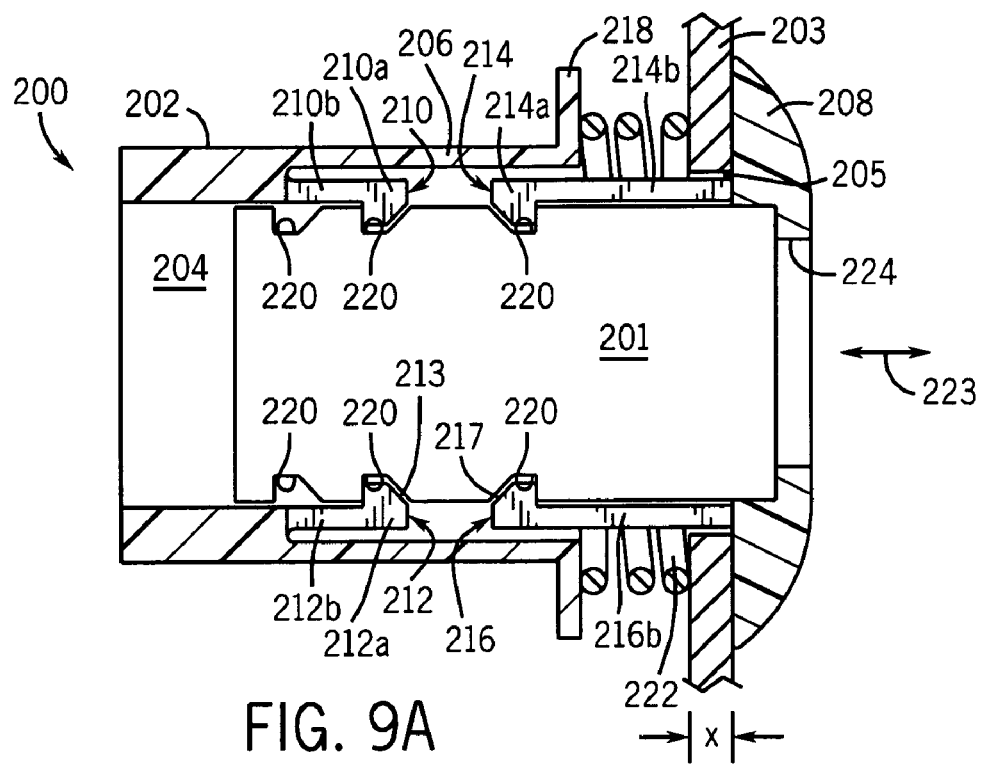
FIGS. 9A-9B are cross-sectional views of exemplary embodiments of a mounting mechanism including a snapping mechanism that is being utilized to mount a sensing device onto a panel-type supporting structure.

FIG. 9A is a cross-sectional view showing still another sensing device mounting mechanism 200 for mounting to a supporting structure 203 in accordance with at least one embodiment of the present invention. The mounting mechanism 200 again includes a housing 202 defining an interior 204 and a sensing device 201 is shown positioned within the interior 204. Further, in the present embodiment, the housing 202 includes two component portions, a substantially cylindrical stem portion 206 and a mushroom-like flange portion 208. Stem portion 206 includes interior snapping mechanisms 210, 212 and flange portion 208 includes interior snapping mechanisms 214, 216. In the present embodiment, stem portion snapping mechanisms 210, 212 include ramp shaped portions 210a, 212a, respectively, and substantially straight portions 210b, 212b, respectively. Similarly, snapping mechanisms 214, 216 include ramp shaped portions 214a, 216a, respectively, and substantially straight portions 214b, 216b, respectively. Here again, the size, shape, quantity and position of interior snapping mechanisms can vary to convenience. Stem portion 206 further includes disc-shaped extension rim 218.

Further, as shown, the sensing device 201 includes a plurality of notches or grooves 220. The grooves 220 are shaped to receive stem portion snapping mechanisms 210, 212, and flange portions snapping mechanisms 214, 216, respectively, and in particular the respective ramped surfaces 211, 213, 215, and 217 of the snapping mechanisms, to secure the sensing device 201. In one embodiment, the notches 220 can be formed axially in a slot (not shown) extending along the surface of the sensing device so as to be positioned, one in front of another, in linear fashion. In the present embodiment, the mounting mechanism 200 is further shown to include a spring 222 that can be used to tension the mounting mechanism as described below. However, it should be understood that a piece of foam, rubber, or other material having similar cushioning and/or spring-like characteristics, can be used in place of, or in conjunction with, the spring(s) as desired. In an alternative embodiment, the spring 222 could be replaced by leaf spring-type elements that may be either integrally molded to the stem portion rim 218, or attached to the stem portion rim 218 as a separate piece. Exemplary leaf spring-type elements, as well as various uses of such elements, are described in U.S. patent application Ser. No. 11/240,034 entitled "Sensor Mounting Structure Allowing For Adjustment Of Sensor Position" filed on even date herewith, which is hereby incorporated by reference herein.

Still referring to FIG. 9A, the sensing device 201 can be mounted onto supporting structure 203 in the following manner. Flange portion 208 can be fit or passed through orifice 205 of supporting structure 203 so that the flange portion and supporting structure abut or substantially abut one another. Flange portion fits over or around the sensing device 201, and the interior snapping mechanisms, 214, 216 snap into corresponding notches 220 on the sensing device so as to lock the sensing device in place relative to the flange portion 208. The spring 222 is then slid over the sensing device 201 such that the spring is positioned in overlay relationship with respect to the sensing device, e.g., the spring fits concentrically around the flange portion 208 (and particularly around snapping mechanisms 214, 216), which surrounds the sensing device. The stem portion 206 is then slid over the sensing device 201 and, when this occurs, the spring 222 is compressed by the stem portion rim 218 against the supporting structure 203 until the interior snapping mechanisms 210, 212 engage complementary sensing device notches 220 via a snap-fit.

Advantageously, due to the incorporation of the spring 222, the position of the stem portion 206 can be varied with respect to the flange portion 208 in a direction indicated by arrow 223. In this manner, the mounting mechanism 200 can be mounted to supporting structures of varying gauge thickness "x". The flange portion 208 includes one or more stops 224, which serve to further secure the sensing device 201 relative to the flange portion. Notably, once compressed, the spring 222, pushes the cylindrical stem portion 206 away from the supporting structure 203, and thereby acts as a tensioning device to hold, in cooperation with the interior snapping mechanisms 210, 212, 214, and 216, the sensing device 201 and mounting mechanism 200 in a mounted position.

Figure 9B:
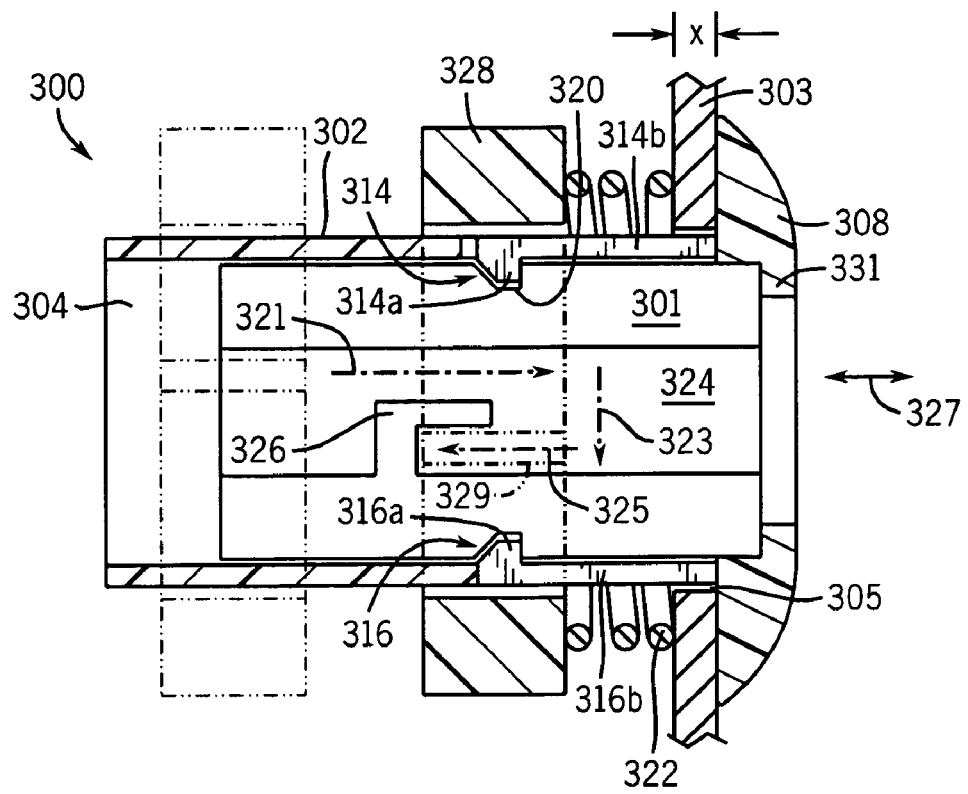

FIG. 9B is a cross-sectional view showing still another sensing device mounting mechanism 300, similar to FIG. 9A, for mounting a sensing device 301 to a supporting structure 303 in accordance with at least one embodiment of the present invention. The mounting mechanism 300 again includes a housing 302 defining an interior 304 and a sensing device 301 is shown positioned within the interior 304. Further, in the present embodiment, the housing 302 includes a mushroom-like flange portion 308 that includes interior snapping mechanisms 314, 316. In the present embodiment, the snapping mechanisms 314, 316 include ramp shaped portions 314a, 316a, respectively, and substantially straight portions 314b, 316b, respectively. Here again, the size, shape, quantity and position of interior snapping mechanisms can vary to convenience.

Still referring to FIG. 9B, the sensing device 301 includes a plurality of notches 320 which are shaped to receive the flange portion snapping mechanisms 314, 316, respectively. In one embodiment, the notches 320 can be formed in an axially-extending slot (not shown) so as to be positioned, one in front of another, in linear fashion. In the present embodiment, the mounting mechanism 300 is further shown to include a spring 322 that can be used to tension the mounting mechanism as described below. While a spring is used, it should be understood that a piece of foam, rubber, or other material having similar cushioning and/or spring-like characteristics, can be used in place of, or in conjunction with, the spring(s) as desired. The sensing device further includes a slot 324, into which a catch mechanism 326 (or simply a "catch") is created. The mounting mechanism 300 further includes another, substantially cylindrical housing portion 328, and in the present embodiment, the housing portion 328 comprises a slip nut, 306 having internal protrusion(s) 329 for engaging the catch mechanism 326. That is, the annular slip nut 306 includes a radially-inwardly extending protrusion or tooth. In alternative embodiments, the annular slip nut 306 can include a plurality (e.g., two) of inwardly extending protrusions and engage a plurality of complementary catch mechanisms.

The sensing device 301 can be mounted onto supporting structure 303 in the following manner. Flange portion 308 can be fit or passed through orifice 305 of supporting structure 303 so that the flange portion and supporting structure abut or substantially abut one another. Flange portion fits over or around the sensing device 301, and the interior snapping mechanisms 314, 316 snap into corresponding notches 320 on the sensing device so as to lock the sensing device in place relative to the flange portion 308. The spring 322 is then slid over the sensing device 301 such that the spring is positioned in overlay relationship with respect to the sensing device, e.g., the spring fits concentrically around the flange portion 308 (and particularly around snapping mechanisms 314, 316), which surrounds the sensing device. The slip nut housing 306 is then slid from an initial position (indicated by the phantom lines) over (or around) and axially along the sensing device 301 so a s to compress the spring 322. This positioning is indicated by arrow 321. The slip nut 306 is then rotated and then allowed to move backward due to the force of the spring 322 (i.e., towards its initial position), with these motions indicated arrows 323 and 325. The rotation, coupled with the movement backwards, causes the slip nut to engage the catch mechanism 326 via the protrusion 329. Once the slip nut 306 is engaged with the catch mechanism, the spring 322 is compressed against the supporting structure 303 continues to force the slip nut backwards. In this manner, the sensing device 301 is held firmly in place. Moreover, snapping mechanisms 314, 316 are secured or locked into place so that they do not disengage from the sensing device 301.

Still referring to FIG. 9B, the position of the of the slip nut housing portion 306 can be varied with respect to the flange portion 308 in a direction indicated by arrow 327. Also, the mounting mechanism 300 can be mounted to supporting structures of varying gauge thickness "x" (varying gauge thickness will result in varying degrees of compression of the spring). As with FIG. 9A, the flange portion 308 includes one or more stops 331, which serve to further secure the sensing device 301 relative to the flange portion. Sensing device 301, as a result, is positioned in a mounted position. Notably, once compressed, the spring 322 pushes the slip nut 306 away from the supporting structure 303, and thereby acts as a tensioning device to hold, in cooperation with the interior snapping mechanism 314, and 316, the sensing device 301 and mounting mechanism 300 in a mounted position.

Figure 10:
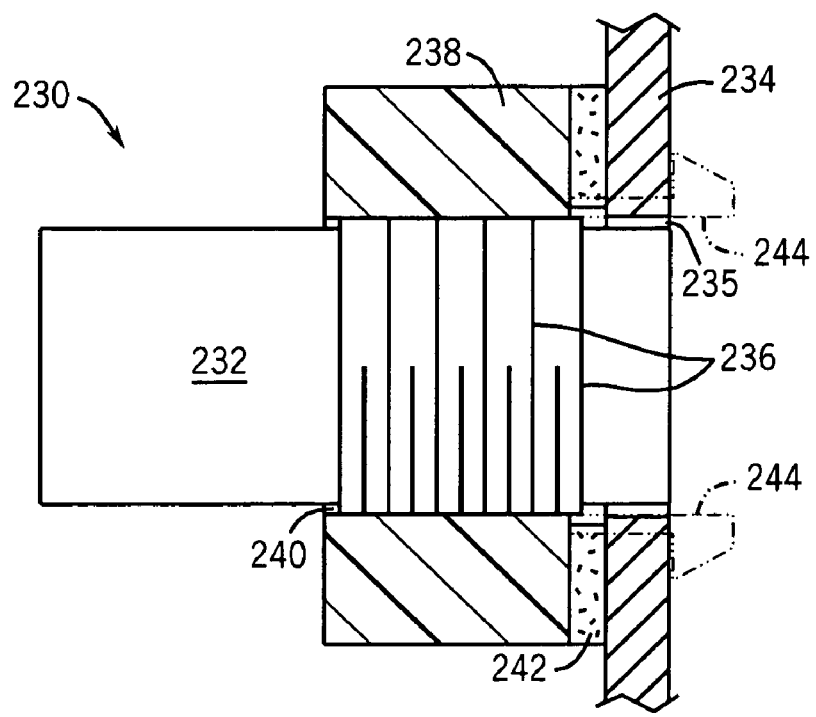
FIG. 10 is a cross-sectional view of another exemplary embodiment of a mounting mechanism including (in at least some cases) a snapping mechanism that is being utilized to mount a sensing device onto a panel-type supporting structure.

FIG. 10 is a generalized cross-sectional view of another exemplary embodiment of a mounting mechanism 230 for mounting a sensing device 232 onto a panel-type supporting structure 234. In the present embodiment, sensing device 232 includes a threaded surface 236, which can engage an interior area 240 of a housing or spacer 238 that is threaded in complementary fashion to receive the sensing device. As such, at least a portion of the sensing device 232 is received and supported within the interior space 240. The housing 238 and threadably engaged sensing device can be secured to the supporting structure 234 via an orifice 235 in the supporting structure and using an adhesive material (e.g., a double sided adhesive tape) 242. Advantageously, the threaded housing 238 is sized to ensure that the threaded surface 236 is properly positioned with respect to the supporting structure 234. In the present embodiment, one or more snapping mechanisms 244 (shown in phantom) can also be included as part of the housing 238 in order to couple or mount the mounting mechanism 230 to the supporting structure (in place of, or in addition to, the adhesive tape 242).

Figure 11:
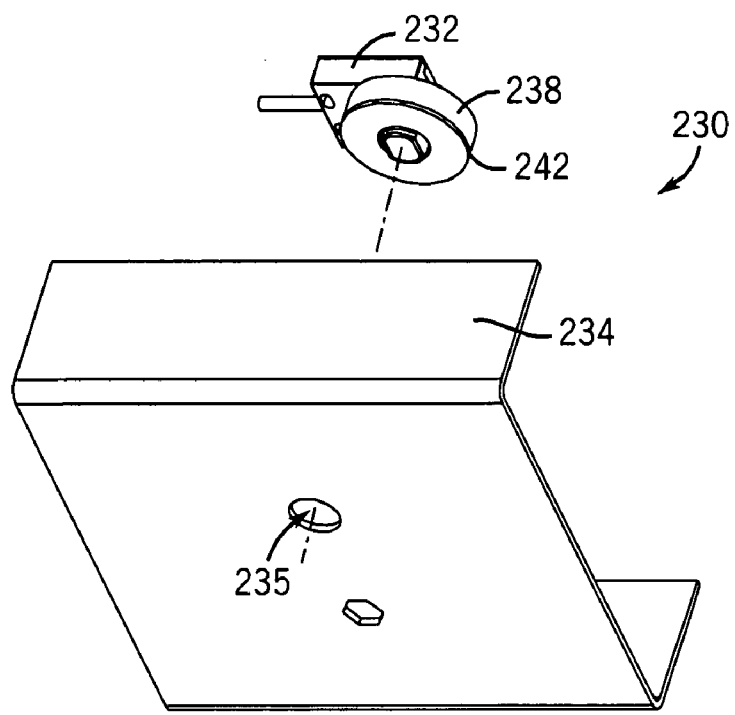
FIG. 11 is a cross-sectional view of another exemplary embodiment of a mounting mechanism including a snapping mechanism that is being utilized to mount a sensing device onto a panel-type supporting structure.

FIG. 11 illustrates an enlarged perspective view of a particular variation of the embodiment of the mounting mechanism 230 shown in FIG. 10 for mounting a sensing device 232 onto a panel-type supporting structure 234 having an orifice 235 for receiving the mounting mechanism 230 and/or sensing device 232. In this embodiment, the mounting mechanism 230 includes a spacer 238 for at least partially housing at least a portion of the sensing device 232. Mounting mechanism 230 further includes the adhesive material 242 for coupling the mounting mechanism to the supporting structure 234. In this embodiment, the portion of the sensing device supported within the spacer 238 is generally cylindrical, but with flattened side portions. Consequently, D-shaped orifices exist between the sensing device and the spacer 238. In alternate embodiments, snapping mechanism extensions of the spacer can exist within these D-shaped regions and extend outward so as to protrude through and snap onto the supporting structure orifice.

Figure 12:
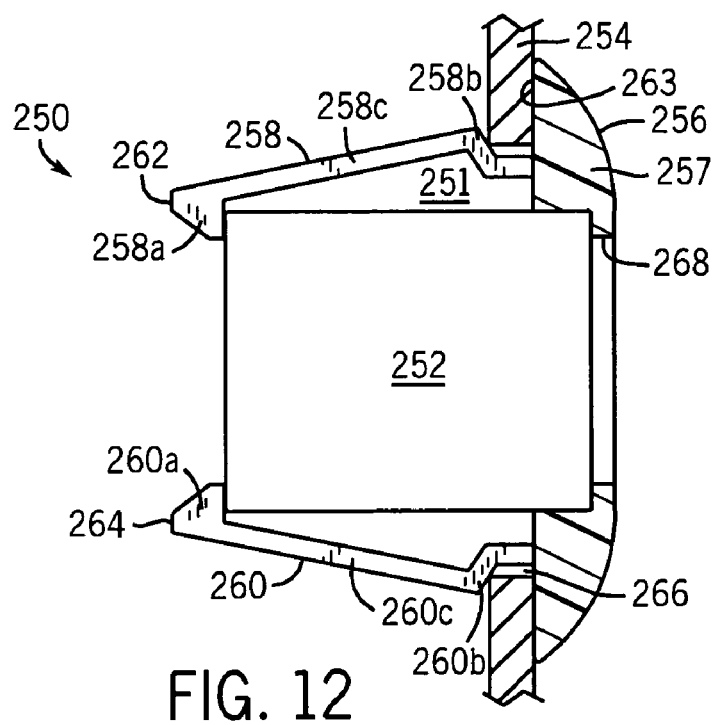
FIG. 12 is a cross-sectional view of another exemplary embodiment of a mounting mechanism including a snapping mechanism that is being utilized to mount a sensing device onto a panel-type supporting structure.

FIG. 12 is a cross-sectional view of another exemplary embodiment of a mounting mechanism 250 for mounting a sensing device 252 onto a panel-type supporting structure 254. Here again, although the mounting mechanism 250, as well as the supporting structure 254 (and the sensing device 252), can have a variety of different structural forms and shapes depending upon the embodiment, the mounting mechanism 252 includes a housing 256 including a flange portion 257 coupled to a plurality of snapping mechanisms 258, 260. The flange portion 257 includes a generally circular disc-shaped surface 263 that extends from the snapping mechanisms 258, 260, and the disc-shaped surface substantially abuts the supporting structure 254 when the mounting mechanism is mounted and ready for use. Sensing device 252 is shown positioned within an interior 251 of the housing 256, and bounded by the flange portion 257 and the plurality of snapping mechanisms 258, 260. Each of the snapping mechanisms 258, 260 includes a sensing device coupling portion 258a, 260a, as well as a supporting structure engagement portion 258b, 260b, with each of the sensing device coupling portions and the supporting structure engagement portions joined by sloped stem portions 258c, 260c, respectively.

As with the previous embodiments, the mounting mechanism 250 is positioned onto the supporting structure 254, which is a panel (or other substantially flat flange or wall of low to moderate thickness), by inserting ends 262, 264 of the snapping mechanisms 258, 260 through the supporting structure 254 and passing the mounting mechanism 250 through the supporting structure up until the flange portion 257 substantially abuts the supporting structure. Sensing device 252 is inserted into an interior 251 of the housing 256. Advantageously, the flanged portion 257 includes one or more stops 268 that serve to further secure the sensing device 252 within the interior 251 of the housing 256. It is notable that the snapping mechanisms 258, 260 of the present embodiment serve a dual purpose; to receive and engage the sensing device 252 in a mounted position within a housing interior 251, and to couple the housing 256 to the supporting structure 254.

Figure 13E:
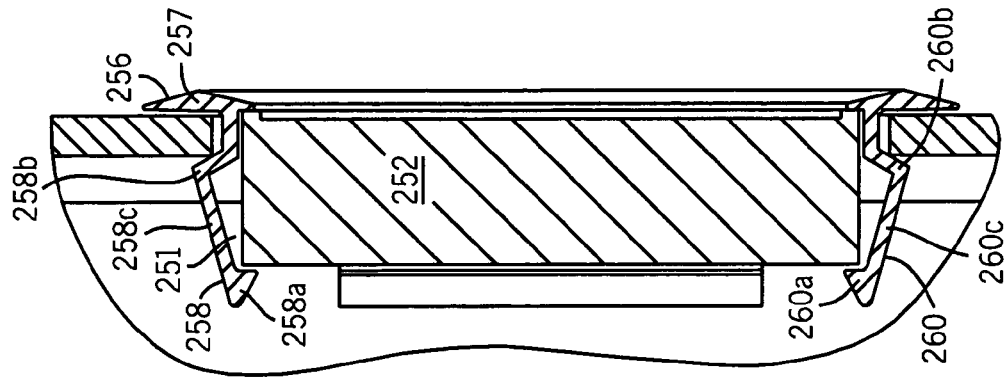
FIG. 13A-13E illustrate exploded, side sectional, and enlarged detailed views of a particular variation of the embodiment of the mounting mechanism shown in FIG. 12.
Figure 13D:
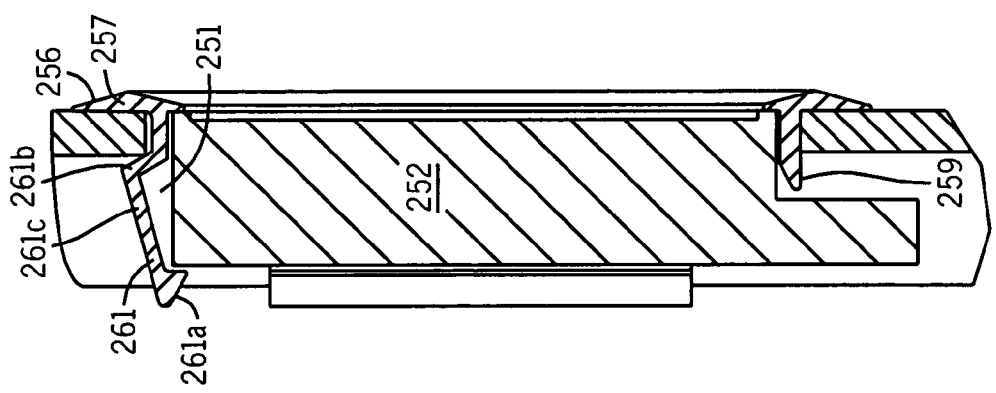
Figure 13A:
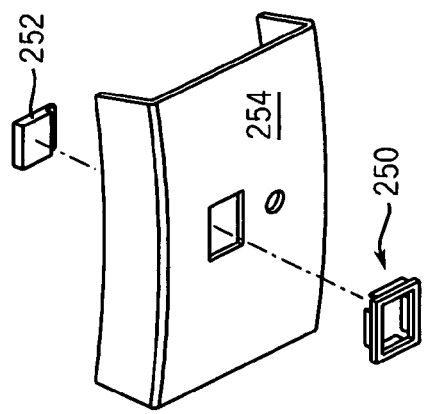
Figure 13C:
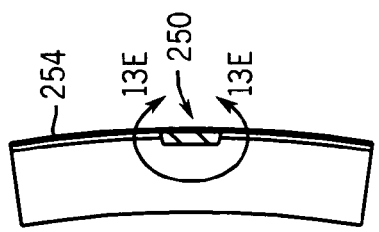
Figure 13B:
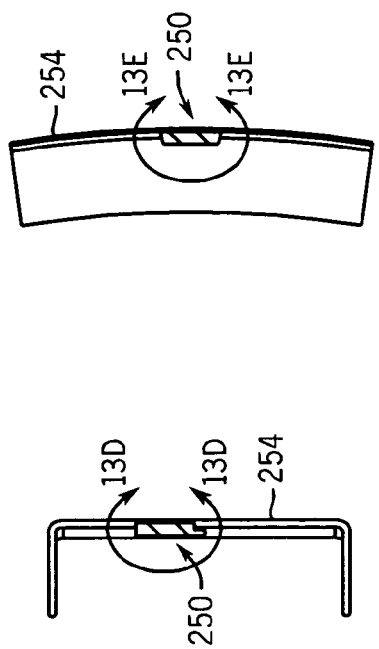

FIGS. 13A-E illustrate exploded, side section, and enlarged detailed views of a particular variation of the embodiment of the mounting mechanism 250 shown in FIG. 12 for mounting the sensing device 252 onto the panel-type supporting structure 254. More specifically, the mounting mechanism 250 of FIGS. 13A-E includes a housing 256 including a flange portion 257 coupled to a plurality of snapping mechanisms, in this example labeled generally as mechanisms 258, 260, and 261. A sensing device 252 (which can be a reflective sensing device) is shown positioned within the interior 251 of the housing 256. With reference to FIG. 13E, each of the snapping mechanisms 258, 260 includes a sensing device coupling portion 258a, 260a, as well as a supporting structure engagement portion 258b, 260b, with the sensing device coupling portions and the supporting structure engagement portions joined by sloped stem portions 258c, 260c, respectively. With reference to FIG. 13D, the snapping device 261 is also shown to include a sensing device coupling portion 261 a, as well as a supporting structure engagement portion 261b, with these portions joined by sloped stem portion 261c. A further supporting flange 259 (albeit not a snapping mechanism) is shown to support the sensing device on the opposite side of the side interfacing snapping mechanism 261.

Figure 14:
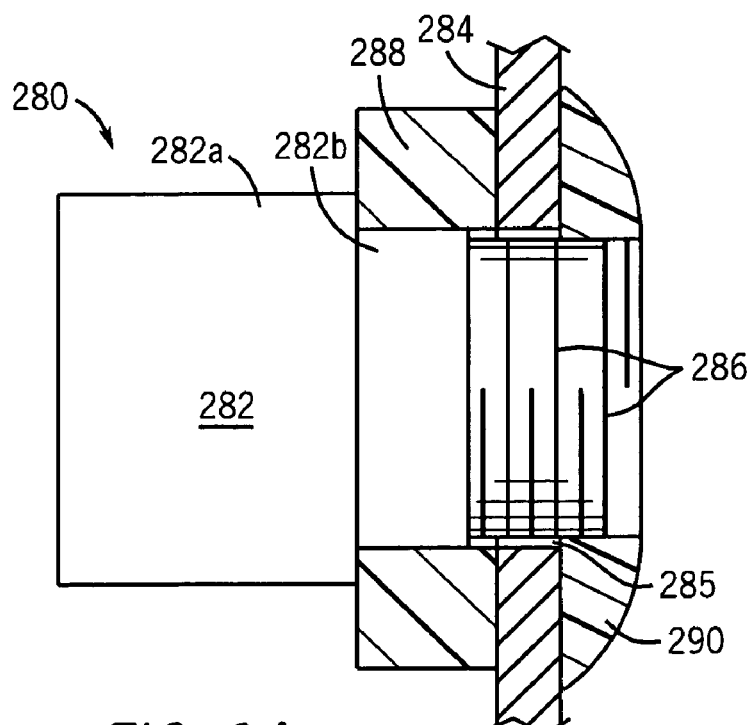
FIG. 14 is a cross-sectional view of another exemplary embodiment of a further mounting mechanism that is being utilized to mount a sensing device onto a panel-type supporting structure.

FIG. 14 is a generalized cross-sectional view of another exemplary embodiment of a mounting mechanism 280 for mounting a sensing device 282 onto a panel-type supporting structure 284. In the present embodiment, sensing device 282 includes a wider portion 282a and a narrower portion 282b, with the narrower portion having at least a partially threaded surface region 286, which can engage an interior area of a housing or spacer 288. As such, at least a portion of the sensing device 282 is received and supported within the spacer or housing 288. The spacer 288 and the sensing device 282 can be secured to the supporting structure 284 via an orifice 285 in the supporting structure and a flange or flange-like structural portion or member 290, which can also serve as at least a partial housing or cover for the sensing device 282. In the present embodiment, member 290 can comprise a nut and lock washer in combination, which can include a threaded portion (not shown) that can receive the threaded surface of the sensing device 282. The spacer or housing 288 further serves to align the sensing device to the orifice 285 in the supporting structure. In further embodiments, one or more snapping mechanisms (not shown) can also be utilized, for example, in conjunction with the flange-like structural portion 290, to couple or mount the mounting mechanism 280 to the supporting structure.

Figure 15:
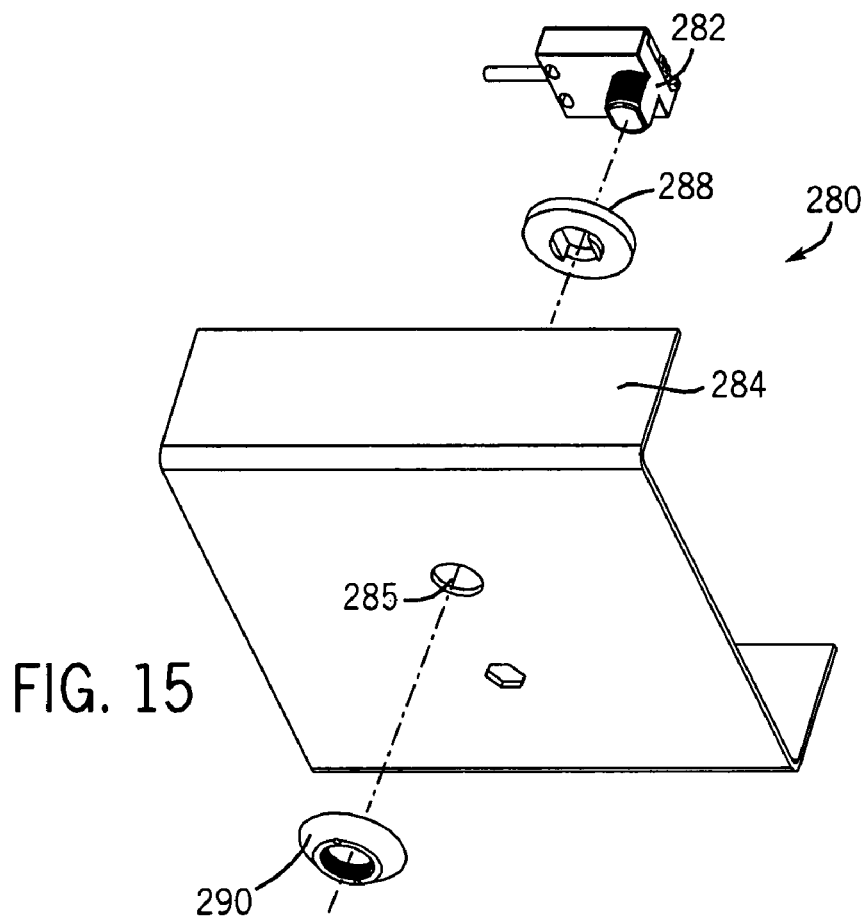
FIG. 15 illustrates an exploded view of a particular variation of the embodiment of the mounting mechanism shown in FIG. 14.

FIG. 15 illustrates an enlarged perspective view of a particular variation of the embodiment of the mounting mechanism 280 shown in FIG. 14 for mounting the sensing device 282 onto the panel-type supporting structure 284. In this embodiment, the sensing device 282 includes a box-shaped main portion with a generally cylindrical protrusion having flattened sides, where the cylindrical (curved) sides of the protrusion are threaded. The mounting mechanism 280 further includes a spacer 288 for at least partially housing at least a portion of the generally cylindrical protrusion of the sensing device 282. The supporting structure 284 includes an orifice 285 for receiving the generally cylindrical protrusion of the sensing device 282. Mounting mechanism 280 further includes a flange or flange-type structure 290 for coupling the mounting mechanism to the supporting structure 284. As shown, the structure 290 includes a beveled nut with a lock washer located underneath the nut. The mounting mechanism 280 is attached to the supporting structure 284 due to the interfacing of the threaded, curved sides of the cylindrical protrusion with the flange-type structure 290. In certain alternate embodiments, the spacer 288 could also (or in alternatively) include snap mechanisms extending through D-shaped spaces within orifice 284 between the orifice and the flattened sides of the cylindrical protrusion, through the structure 290, to allow for coupling of the mounting mechanism to the supporting structure.

Figure 16:
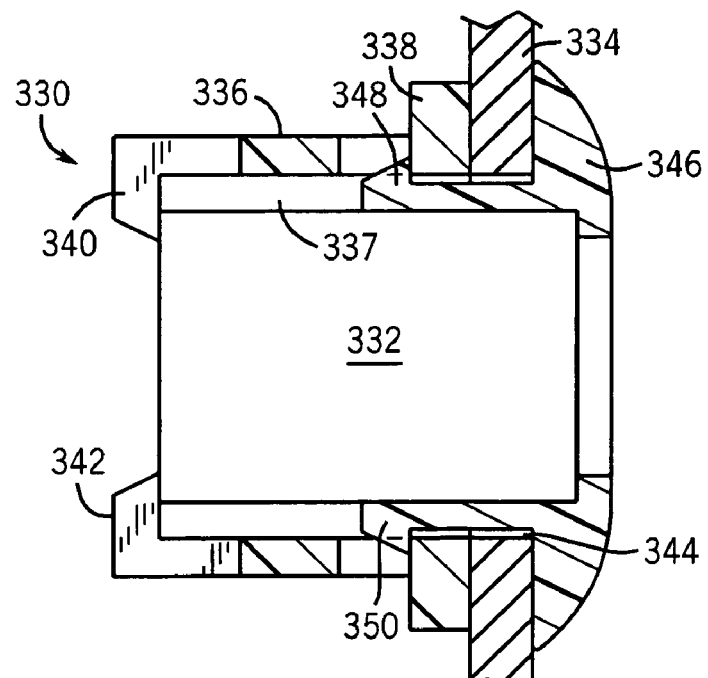
FIG. 16 is a cross-sectional view of another exemplary embodiment of a mounting mechanism including a snapping mechanism that is being utilized to mount a sensing device onto a panel-type supporting structure.

Turning to FIG. 16, a generalized cross-sectional view of another exemplary embodiment of a mounting mechanism 330 for mounting a sensing device 332 onto a panel-type supporting structure 334 is shown. In the present embodiment, the mounting mechanism 330 can include a housing structure 336 defining an interior area 337 into which the sensing device 332 can be at least partially received and supported. More specifically, the housing structure 336 can include a first housing portion or spacer 338 that can engage or be coupled (at least indirectly) to the sensing device 332. As shown, the sensing device 332 engages the housing portion 338 via a plurality of snapping mechanisms 340, 342, although other attachment means (e.g., one or more screws, etc.) are possible and considered within the scope of the invention. The housing portion 338 and the sensing device 332 can be secured to the supporting structure 334 via an orifice 344 in the supporting structure and using a flange or flange-like structural portion or member 346, which can also serve as at least a partial housing or cover for the sensing device 332. In the present embodiment, flange portion 346 includes one or more snapping mechanisms 348, 350 to couple or mount the sensing device 332 to the supporting structure 334. It is of note that the spacer or housing 338 is an alignment mechanism in that it can be used to align the sensing device 332 to the orifice 344 in the supporting structure.

Figure 17:
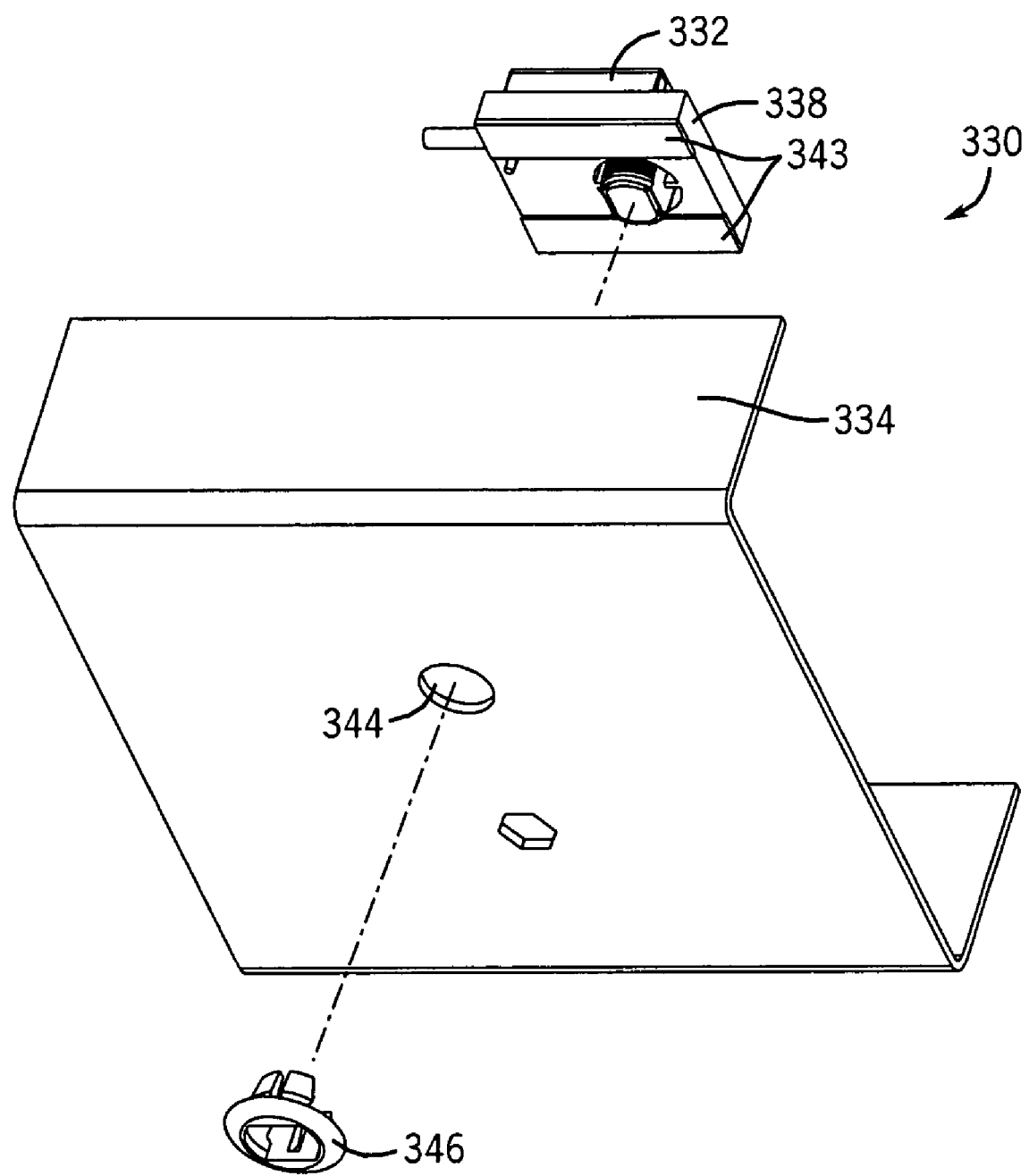
FIG. 17 illustrates an exploded view of a particular variation of the embodiment of the mounting mechanism shown in FIG. 16.

FIG. 17 illustrates an enlarged perspective view of a particular variation of the embodiment of the mounting mechanism 330 shown in FIG. 16 for mounting a sensing device 332 onto the panel-type supporting structure 334. As shown, the mounting mechanism 330 includes a rectangular spacer 338 for at least partially housing at least a generally cylindrical portion of the sensing device 332, and also for spacing apart the box-shaped portion of the sensing device from the supporting structure 334. More particularly, the spacer has an internal threaded channel within which is retained the cylindrical portion of the sensing device 332. As shown, the spacer 338 includes a joining material 343 (e.g., a double sided adhesive tape, foam material or the like) to affix the spacer to the supporting structure as well as to take up tolerance. The supporting structure 334 includes an orifice 344 for receiving the mounting mechanism 330 and/or sensing device 332. Mounting mechanism 330 further includes a flange or flange-type structure 346 for coupling the mounting mechanism to the supporting structure 334. In this embodiment, the portion of the sensing device supported within the spacer 338 is generally cylindrical, but with flattened side portions. Consequently, D-shaped orifices exist between the sensing device and the spacer 338.

Figure 18A:
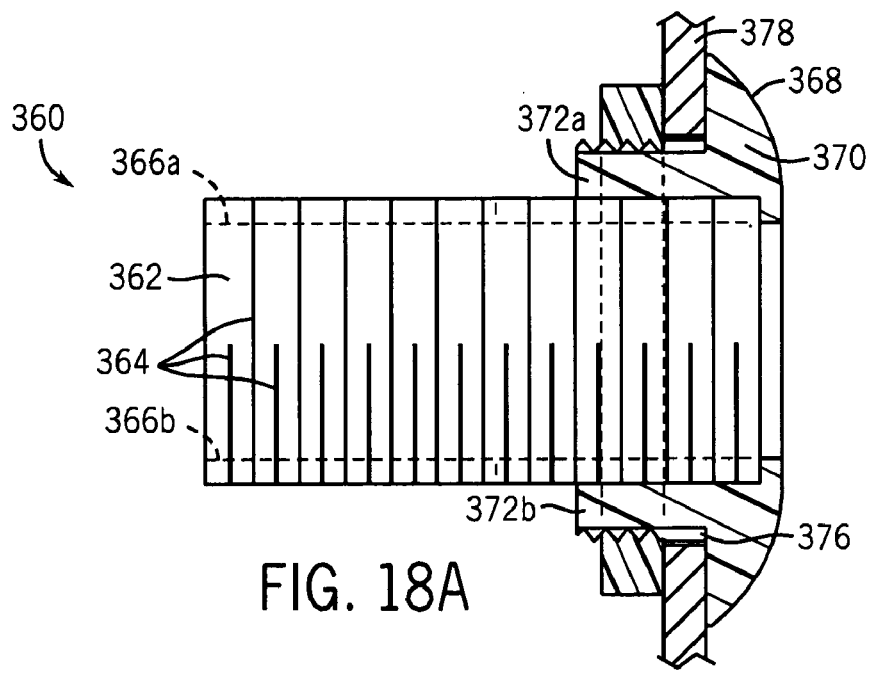
FIGS. 18A-18B illustrate cross-sectional and front end views, respectively, of another exemplary embodiment of a mounting mechanism that is being utilized to mount a sensing device onto a panel-type supporting structure.
Figure 18B:
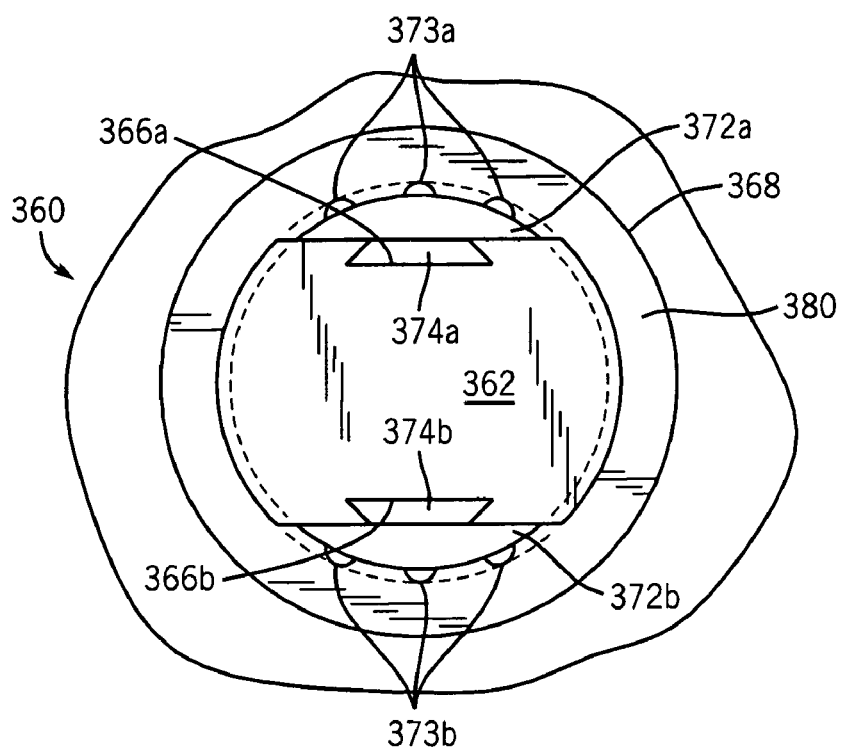

Referring to FIGS. 18A-B, cross-sectional and front end views of another embodiment of a sensing device mounting mechanism 360 is shown for receiving and supporting a sensing device 362 having at least a partially threaded external surface 364 (FIG. 18A) and a pair of recesses 366a-b (FIG. 18B). In one embodiment, the recesses 366a-b can comprise "dovetail slots". The mounting mechanism includes a housing 368 having a mushroom-shaped flange portion 370. The flange portion 370 further comprises a pair of ribbed contoured portions 372a-b (FIG. 18B) having a plurality of ribs 373a-b, and a pair of protrusions 374a-b which are coupled to the contoured portions with the protrusions being complementary in shape to the dovetail slots. The flange 370 is inserted through an orifice 376 in a panel-like supporting structure 378. The sensing device 362 is slidably connected to he flange portion 370, and more specifically, the sensing device recesses 366a-b receive the flange portion protrusions 374a-b, or stated another way, the protrusions slidably engage the recesses. In an alternative embodiment, although not shown, the protrusions and recesses can be replaced by snapping mechanisms of the kind described herein with respect to other of the FIGS. Additionally as shown, a metal nut 380 is then threaded around, so as to engage, the flange portion 370 until the sensing device is secured in its mounted position. Advantageously, and more specifically, as the nut 380 is threaded forwardly onto the sensing device 362, the threads of the nut cut into the plurality of contoured portion ribs 373a-b. In this fashion, the nut is substantially prevented from disengaging from the sensing device 362, and possibly additional pressure is communicated through the complementary dovetail slots and protrusions to lock the sensing device in place. In the present embodiment, as with the previously described FIGS., the type, size, shape, number and position of the connectors, recesses, slots, housing and supporting structures and portions, protrusions and the like can be varied and still be considered within of the present invention.

While the mounting mechanism 330 shown herein can be constructed from a variety of materials, in some embodiments, the mechanisms can comprise metallic material (e.g., aluminum), a molded plastic, and/or a molded polymeric material. In conjunction with the above, the sensing device mounting mechanisms also in some embodiments can be mounted in a fixed, or substantially fixed, manner with respect to the supporting structure using, for example, one or more screws, bolts, an adhesive (or Velcro®) or any of a variety of other fastening devices or methodologies, albeit all such possible fastening devices are not shown explicitly in the FIGS.

Further, one or more of the various advantages achieved by different embodiments of the present invention could be implemented in conjunction with other types of mounting mechanism features, some of which are not necessarily disclosed in detail herein, to arrive at additional mounting mechanisms that are comprised within the present invention. For example, certain embodiments of the present invention could also or alternatively employ a housing and a sleeve that were slidably movable in relation to one another as disclosed in U.S. patent application Ser. No. 11/240,033 entitled "Sensor Mounting Structure With Adjustable Swivel-Ball and Panel Mounting Mechanism". Also, some further embodiments could employ features allowing for orientational adjustment of the sensing device as described in U.S. patent application Ser. No. 11/240,034 entitled "Sensor Mounting Structure Allowing For Adjustment Of Sensor Position". Additionally, the present invention is intended to encompass a wide variety of sensor mounting structures having a variety of components, including components not discussed in detail herein. For example, the present invention can include embodiments of mounting mechanisms that also include light pipes, as described in U.S. patent Ser. No. 11/240,019 entitled "Sensor Mounting Structure With Light Pipe"

It is specifically intended that the present invention not be limited to the embodiments and illustrations contained herein, but include modified forms of those embodiments including portions of the embodiments and combinations of elements of different embodiments as come within the scope of the following claims.

We claim:

1. A sensing device mounting mechanism allowing for a sensing device to be mounted in relation to a supporting structure, the sensing device mounting mechanism comprising:
   a housing portion having first and second snapping mechanisms,
   wherein the first snapping mechanism allows the housing portion to be coupled to the supporting structure, and the second snapping mechanism allows the housing portion to be coupled to the sensing device, and
   wherein the first snapping mechanism allows coupling of the housing portion to the supporting structure independently of the position of the sensing device relative to the housing portion.

2. The sensing device mounting mechanism of claim 1 wherein the housing portion further includes a stem portion and a flange portion extending from the stem portion and wherein the housing portion can be positioned onto the supporting structure by passing the stem portion through an orifice in the supporting structure until the flange portion substantially abuts the supporting structure.

3. The sensing device mounting mechanism of claim 1 wherein at least one of the snapping mechanisms includes at least one ramped surface portion.

4. The sensing device mounting mechanism of claim 1 wherein the first snapping mechanism is sized to correspond to at least one dimension of the supporting structure.

5. The sensing device mounting mechanism of claim 1 wherein the sensing device is positioned to abut the first snapping mechanism when the housing portion is mounted to the support structure so as to create a force that locks the first snapping mechanism into place.

6. The sensing device mounting mechanism of claim 1 wherein at least one of the snapping mechanisms includes a surface contoured to facilitate insertion of the sensing device into an interior of the housing portion.

7. The sensing device mounting mechanism of claim 1 wherein a flanged portion of the housing portion includes at least one stop to at least partially position and secure the sensing device into the interior.

8. The sensing device mounting mechanism of claim 1 wherein at least one of the snapping mechanisms is at least one of substantially arrow shaped and substantially dumbbell shaped.

9. The sensing device mounting mechanism of claim 1 wherein the first snapping mechanism is a protrusion on the exterior surface of the housing portion that is substantially fixed in position.

10. The sensing device mounting mechanism of claim 1 wherein the sensing device is rotatably coupled to the housing portion or the housing portion is rotatably mounted to the supporting structure.

11. The sensing device mounting mechanism of claim 1 wherein the sensing device is coupled to the housing portion using at least one of a slidable coupling, a rotatable coupling, a snap-fit, an adhesive, a screw, and a bolt.

12. The sensing device mounting mechanism of claim 1 wherein the housing portion includes a flange portion and the sensing device is rotatably coupled to the flange portion.

13. The sensing device mounting mechanism of claim 1, wherein the housing portion includes an interior capable of receiving the sensing device, the interior having a longitudinal axis that is angularly offset from an additional axis that extends perpendicularly relative to a surface of the supporting structure.

14. A sensing device mounting mechanism allowing for a sensing device to be mounted in relation to a supporting structure, the sensing device mounting mechanism comprising:
   a housing having a snapping mechanism,
      wherein the snapping mechanism allows the housing to be coupled to at least one of the supporting structure, the sensing device, and an additional portion of the sensing device mounting mechanism,
      wherein the housing further includes a stem portion and a flange portion extending from the stem portion, the stem portion having an end that is distal from the flange portion, and wherein the mounting mechanism further comprises at least one snapping mechanism that extends from at least one of the flange portion toward the distal end and from a location on the stem portion toward the flange portion away from the distal end.

15. The sensing device mounting mechanism of claim 14, wherein the sensing device is positioned to abut the at least one snapping mechanism when the housing is mounted to the support structure so as to create a force that locks the at least one snapping mechanism into place.

16. A sensing device mounting mechanism allowing for a sensing device to be mounted in relation to a supporting structure, the sensing device mounting mechanism comprising:
   a housing portion having a snapping mechanism,
      wherein the snapping mechanism allows the housing portion to be coupled to at least one of the supporting structure, the sensing device, and an additional portion of the sensing device mounting mechanism,
      wherein the sensing device includes a surface having a toothed profile, and the snapping mechanism includes a surface having a toothed profile that is complementary to the sensing device surface having the toothed profile.

17. The sensing device mounting mechanism of claim 16, wherein the surfaces with the toothed profiles are ratcheting surfaces.

18. The sensing device mounting mechanism of claim 16, wherein the surfaces with the toothed profiles abut one another when the sensing device is positioned within the housing portion, such that the snapping mechanism of the housing portion is locked into place relative to the support structure.

19. The sensing device mounting mechanism of claim 16, wherein the housing portion includes first and second walls, wherein the first wall includes the snapping mechanism with the toothed profile by which the housing portion can be coupled to the sensing device, and the second wall includes an additional snapping mechanism by which the housing portion can be coupled to the supporting structure.

20. The sensing device mounting mechanism of claim 19, wherein the housing portion includes third and fourth walls in addition to the first and second walls, wherein the first, second, third and fourth walls substantially form an exterior perimeter of the housing portion, and wherein the third wall includes a further snapping mechanism with a toothed profile by which the housing portion can be coupled to the sensing device, and the fourth wall includes a further additional snapping mechanism by which the housing portion can be coupled to the supporting structure.

21. The sensing device mounting mechanism of claim 16 wherein the snapping mechanism is sized to correspond to at least one dimension of the supporting structure.

22. The sensing device mounting mechanism of claim 16, wherein the housing portion includes an interior capable of receiving the sensing device, the interior having a longitudinal axis that is angularly offset from an additional axis that extends perpendicularly relative to a surface of the supporting structure.

23. A sensing device mounting mechanism allowing for a sensing device to be mounted in relation to a supporting structure, the sensing device mounting mechanism comprising:
   a housing portion having a snapping mechanism,
      wherein the snapping mechanism allows the housing portion to be coupled to at least one of the supporting structure, the sensing device, and an additional portion of the sensing device mounting mechanism,
      wherein the housing portion includes a substantially cylindrical interior that is not adjustable in position relative to the housing portion and that is defined either by the housing portion or an additional structure coupled to the housing portion, the interior having a central axis that is angularly offset from a perpendicular axis to the supporting structure.

24. The sensing device mounting mechanism of claim 23 wherein the housing is configured to be connected to the supporting structure via at least one of the following: a snapping mechanism, an adhesive, a screw, a bolt, Velcro®, a dove tail, a slot, a recess, and a pair of appendages that clamp onto the supporting structure.

25. A sensing device mounting mechanism allowing for a sensing device to be mounted in relation to a supporting structure, the sensing device mounting mechanism comprising:
   a housing portion having a snapping mechanism,
      wherein the snapping mechanism allows the housing portion to be coupled to at least one of the supporting structure, the sensing device, and an additional portion of the sensing device mounting mechanism,
      wherein the mounting mechanism includes at least one of a piece of foam, a piece of rubber, a compressible material and a spring to permit adjustment of a distance between the housing portion and the supporting structure based on a gauge thickness of the supporting structure.

26. The sensing device mounting mechanism of claim 25 wherein the snapping mechanism engages an orifice in the housing portion to at least in part secure the housing portion to the supporting structure.

27. The sensing device mounting mechanism of claim 25, wherein the snapping mechanism functions both to receive and engage the sensing device in a mounted position with respect to the supporting structure and to couple the housing portion to the supporting structure.

28. The sensing device mounting mechanism of claim 25 wherein the sensing device is positioned to abut the snapping mechanism when the housing portion is mounted to the support structure so as to create a force that locks the snapping mechanism into place.

29. The sensing device mounting mechanism of claim 25 wherein a flanged portion of the housing portion includes at least one stop to at least partially position and secure the sensing device into the interior.

30. The sensing device mounting mechanism of claim 25, wherein at least one of the following is true:
   the sensing device is rotatably coupled to the housing portion or the housing portion is rotatably mounted to the supporting structure; and
   the sensing device is coupled to the housing portion using at least one of a slidable coupling, a rotatable coupling, a snap-fit, an adhesive, a screw, and a bolt.

31. The sensing device mounting mechanism of claim 25 wherein the housing portion is configured to be connected to the supporting structure via at least one of the following: a snapping mechanism, an adhesive, a screw, a bolt, Velcro®, a dove tail, a slot, a recess, and a pair of appendages that clamp onto the supporting structure.

32. The sensing device mounting mechanism of claim 25 wherein the housing portion includes a flange portion and the sensing device is rotatably coupled to the flange portion.

33. A sensing device mounting mechanism allowing for a sensing device to be mounted in relation to a supporting structure, the sensing device mounting mechanism comprising:
   a housing portion having a snapping mechanism,
   wherein the snapping mechanism allows the housing portion to be coupled to at least one of the supporting structure, the sensing device, and an additional portion of the sensing device mounting mechanism,
   wherein the housing portion comprises multiple housing sections and a swivel ball is located internally with respect to at least one of the multiple housing sections, the sensing device being mounted on the swivel ball.

34. The sensing device mounting mechanism of claim 33, wherein the swivel ball is located internally with respect to the first of the multiple housing sections, and a second of the multiple housing sections is a flanged portion that is capable of being coupled to the first housing section by way of the snapping mechanism.

35. The sensing device mounting mechanism of claim 33, further including a threaded component having threads that are complementary to additional threads located on the housing portion, wherein the threaded component is capable of rotating relative to the housing portion.

36. The sensing device mounting mechanism of claim 33, wherein the sensing device is coupled to the housing portion using at least one of a slidable coupling, a rotatable coupling, a snap-fit, an adhesive, a screw, and a bolt.

37. The sensing device mounting mechanism of claim 33, wherein the snapping mechanism includes at least one ramped surface portion having at least one ramped surface.

38. A sensing device mounting mechanism allowing for a sensing device to be mounted in relation to a supporting structure, the sensing device mounting mechanism comprising:
   a housing portion having a snapping mechanism,
   wherein the snapping mechanism allows the housing portion to be counted to at least one of the supporting structure, the sensing device, and an additional portion of the sensing device mounting mechanism,
   wherein the housing portion includes an interior ridged surface portion for engaging a complementary ridged surface portion of at least one of an additional snapping mechanism and the sensing device.

39. A sensing device mounting mechanism allowing for a sensing device to be mounted in relation to a supporting structure, the sensing device mounting mechanism comprising:
   a housing portion having a snapping mechanism, wherein the snapping mechanism allows the housing portion to be coupled to at least one of the supporting structure, the sensing device, and an additional portion of the sensing device mounting mechanism,
   wherein the housing portion further comprises a stem portion having at least one interior snapping structure and a flange portion having at least one interior snapping structure, and wherein the at least one stem portion interior snapping structure and the at least one flange portion interior snapping structure engage complementary notches formed in the sensing device so as to secure the sensing device within the interior of the housing portion.

40. The sensing device mounting mechanism of claim 39 further comprising a spring positioned in overlay relationship with respect to the sensing device, and wherein the spring, when compressed, pushes the stem portion away from the supporting structure, and acts as a tensioning device to hold, in cooperation with the interior snapping structures, the sensing device and housing portion in a mounted position.

41. The sensing device mounting mechanism of claim 39, wherein a flanged portion of the housing portion includes at least one stop to at least partially position and secure the sensing device into the interior of the housing portion.

42. A sensing device mounting mechanism allowing for a sensing device to be mounted in relation to a supporting structure, the sensing device mounting mechanism comprising:
   a housing portion having a snapping mechanism,
   wherein the snapping mechanism allows the housing portion to be coupled to at least one of the supporting structure, the sensing device, and an additional portion of the sensing device mounting mechanism,
   further comprising a slip nut for engaging a catch mechanism coupled to the sensing device to secure the sensing device in a mounted position with respect to the supporting structure.

43. The sensing device mounting mechanism of claim 42, wherein the slip nut includes a protrusion and the catch mechanism includes a slot formed within an exterior surface of the sensing device, wherein the slip nut engages the catch mechanism when the protrusion enters the slot.

44. The sensing device mounting mechanism of claim 43, wherein the slip nut is engaged in relation to the catch mechanism by first moving the slip nut axially toward the supporting structure, then rotating the slip nut relative to the sensing device, and finally allowing the slip nut to move axially away from the supporting structure so that the protrusion is within the slot.

45. The sensing device mounting mechanism of claim 42, wherein a spring is positioned in between the slip nut and the supporting structure, the spring tending to push the slip nut away from the supporting structure.

46. The sensing device mounting mechanism of claim 45, wherein the housing portion includes a flanged portion that is configured to abut the supporting structure and from which extends the snapping mechanism, the snapping mechanism capable of being snapped onto the sensing device.

47. A sensor assembly comprising the sensing device mounting mechanism of claim 42 and the sensing device.

48. A sensing device mounting mechanism in combination with a sensing device, the combination comprising:
   a sensing device; and
   a sensing device mounting mechanism comprising:
      a housing mountable to a support structure, the housing defining an interior for receiving and supporting a sensing device, and
      means for providing snapping engagement of at least one of the housing to the supporting structure, and the housing to the sensing device,
   wherein the housing further comprises a stem portion having a plurality of interior snapping mechanisms and a flange portion having a plurality of interior snapping mechanisms, and wherein the stem portion interior snapping mechanisms and the flange portion interior snapping mechanisms engage complementary notches formed in the sensing device so as to secure the sensing device within the interior of the housing.

49. A sensing device mounting mechanism allowing for a sensing device to be mounted in relation to a supporting structure, the sensing device mounting mechanism comprising:

a housing portion having a first snapping mechanism, wherein the snapping mechanism allows the housing portion to be coupled to at least one of the supporting structure, the sensing device, and an additional portion of the sensing device mounting mechanism, wherein the housing portion includes an interior capable of receiving the sensing device, the interior having a longitudinal axis that is angularly offset from an additional axis that extends perpendicularly relative to a surface of the supporting structure, wherein the interior is not adjustable in position relative to the housing portion and is defined either by the housing portion or an additional structure coupled to the housing portion.

50. The sensing device mounting mechanism of claim 49, wherein the housing portion includes a second snapping mechanism in addition to the first snapping mechanism, wherein the first snapping mechanism allows the housing portion to be coupled to the supporting structure, and the second snapping mechanism allows the housing portion to be coupled to the sensing device.

51. The sensing device mounting mechanism of claim 49 wherein the snapping mechanism includes at least one ramped surface portion.

52. The sensing device mounting mechanism of claim 49 wherein the first snapping mechanism is sized to correspond to at least one dimension of the supporting structure.

53. The sensing device mounting mechanism of claim 49 wherein the sensing device is positioned to abut the first snapping mechanism when the housing portion is mounted to the support structure so as to create a force that locks the first snapping mechanism into place.

* * * * *

UNITED STATES PATENT AND TRADEMARK OFFICE
CERTIFICATE OF CORRECTION

PATENT NO.      : 7,415,891 B2
APPLICATION NO. : 11/240175
DATED           : August 26, 2008
INVENTOR(S)     : Roberto S. Santos, Mark S. Schladenhauffen and Dennis C. Mackey It is certified that error appears in the above-identified patent and that said Letters Patent is hereby corrected as shown below:

Column 1, line 47: Replace "modem" with --modern--.
Column 25, line 46: Replace "counted" with --coupled--.

Signed and Sealed this

Eighteenth Day of November, 2008

JON W. DUDAS
*Director of the United States Patent and Trademark Office*